US012804091B2

(12) United States Patent
Ikeda

(10) Patent No.: US 12,804,091 B2
(45) Date of Patent: Nov. 17, 2026

(54) INSPECTION SYSTEM FOR INSPECTING IMAGE FORMED ON SHEET, AND IMAGE FORMING APPARATUS

(71) Applicant: CANON KABUSHIKI KAISHA, Tokyo (JP)

(72) Inventor: Shinya Ikeda, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 263 days.

(21) Appl. No.: 18/595,847

(22) Filed: Mar. 5, 2024

(65) Prior Publication Data

US 2024/0323291 A1 Sep. 26, 2024

(30) Foreign Application Priority Data

Mar. 24, 2023 (JP) ................................ 2023-048614

(51) Int. Cl.
*H04N 1/00* (2006.01)

(52) U.S. Cl.
CPC ..... *H04N 1/00816* (2013.01); *H04N 1/00411* (2013.01); *H04N 1/0044* (2013.01); *H04N 1/00633* (2013.01); *H04N 1/00811* (2013.01)

(58) Field of Classification Search
None
See application file for complete search history.

(56) References Cited

U.S. PATENT DOCUMENTS

2020/0019353 A1* 1/2020 Okajima ............... G06F 3/1257
2021/0216261 A1* 7/2021 Kobashi ............ H04N 1/00005
2023/0061533 A1 3/2023 Sakai
2023/0070196 A1* 3/2023 Misawa ............ G06V 30/1456
2023/0121550 A1* 4/2023 Komazawa .......... G06F 3/1243
358/1.13

FOREIGN PATENT DOCUMENTS

EP 4141817 A1 * 3/2023 ............ G06V 30/12
JP 2012003335 A 1/2012
JP 2020006603 A 1/2020
JP 2021053819 A 4/2021
JP 2023031658 A 3/2023

* cited by examiner

*Primary Examiner* — Dov Popovici
(74) *Attorney, Agent, or Firm* — ROSSI, KIMMS & McDOWELL LLP

(57) ABSTRACT

An inspection system displays a setting screen for setting content of image inspection, sets an area in which an image to be formed is changed for each sheet as a variable area in the setting screen, and executes the image inspection according to a condition set in the setting screen. The system presents a candidate area in which the image inspection is to be performed as the variable area in the setting screen, before the variable area is set by an input device.

21 Claims, 19 Drawing Sheets

INSPECTION SYSTEM FOR INSPECTING IMAGE FORMED ON SHEET, AND IMAGE FORMING APPARATUS

BACKGROUND OF THE INVENTION

Field of the Invention

The present invention relates to an inspection system for inspecting an image formed on a sheet, and an image forming apparatus.

Description of the Related Art

Variable data printing (hereinafter referred to as variable printing) refers to a printing method in which a partial image (e.g., address or barcode) in a plurality of images to be formed on a plurality of sheets is different for each sheet. Japanese Patent Laid-Open No. 2021-053819 proposes executing recovery processing according to error content when an error is found in inspection of a variable area. A variable area refers to an area in which print content is variable for each sheet.

Incidentally, it is not easy for a user to correctly perform inspection settings for a variable area. If the user makes a mistake in the inspection settings, even a sheet on which a correct image has been printed will be discarded. In this case, the user has to review the inspection settings and execute reprinting, and thus, downtime, which is a time in which images cannot be formed by the image forming apparatus, increases.

SUMMARY OF THE INVENTION

The present disclosure provides an inspection system comprising: a display configured to display a setting screen for setting content of image inspection; an input device configured to set an area in which an image to be formed is changed for each sheet as a variable area in the setting screen; and a processor configured to execute the image inspection according to a condition set in the setting screen, wherein the processor presents a candidate area in which the image inspection is to be performed as the variable area in the setting screen, before the variable area is set by the input device.

Further features of the present invention will become apparent from the following description of exemplary embodiments (with reference to the attached drawings).

DESCRIPTION OF THE EMBODIMENTS

Figure 1:
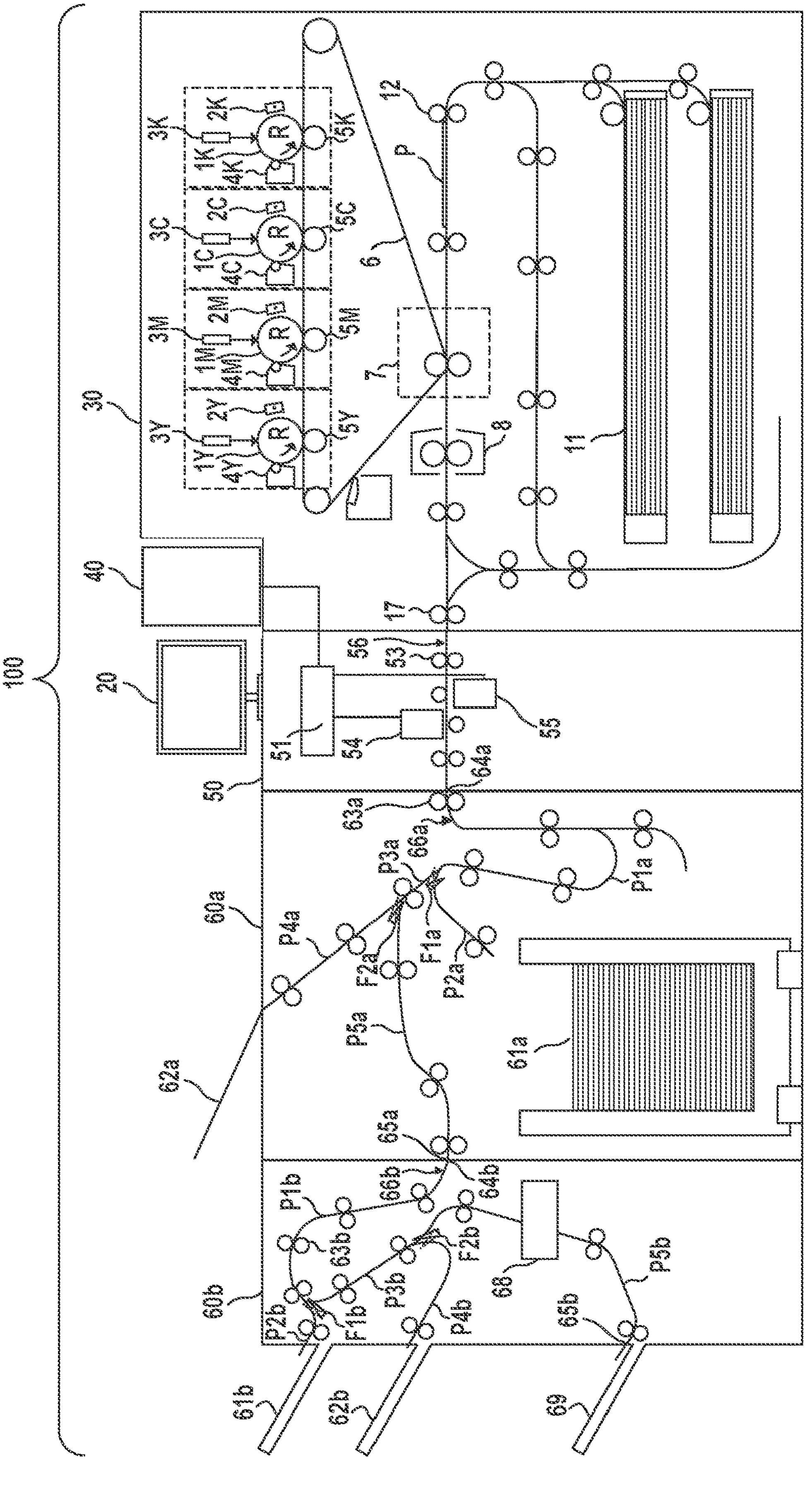
FIG. 1 is a diagram for explaining an image forming system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment (1) System Configuration

As illustrated in FIG. 1, an image forming system 100 includes an operation unit 20, an image forming apparatus 30, a control apparatus 40, an inspection apparatus 50, and stacking apparatuses **60*a* and 60*b*. The image forming apparatus 30, the inspection apparatus 50, and the stacking apparatuses 60*a* and 60*b* each have a separate housing. The number of stacking apparatuses 60 may be one or more. The image forming system 100 may be referred to as an image inspection system. In this example, the stacking apparatus 60*a* may be referred to as a sheet stacker or a sheet conveyance apparatus. The stacking apparatus 60*b*** may be referred to as a finisher or a post-processing apparatus provided with a post-processing function. The same reference numerals are assigned to a plurality of the same or similar components, but trailing lowercase letters (e.g., a, b, etc.) may be omitted when matters common thereto are explained.

The operation unit 20 includes a display apparatus for outputting information to a user and an input apparatus (e.g., touch panel sensor) for accepting an instruction from the user.

The image forming apparatus 30 forms a toner image on a sheet P according to a YMCK color signal supplied from the control apparatus 40. The letters, YMCK, attached to the reference numerals indicate colors of toner: yellow, magenta, cyan, and black. When matters common to the four colors are explained, the letters, YMCK, are omitted from the reference numerals.

A photosensitive body 1 is an image carrier for carrying an electrostatic latent image and a toner image. A charging device 2 uniformly charges the surface of the photosensitive body 1. An exposure device 3 emits a laser beam corresponding to a color signal supplied from the control apparatus 40 to the photosensitive body 1 to form an electrostatic latent image. A developing device 4 develops the electrostatic latent image using toner to form a toner image. A primary transfer roller 5 transfers the toner image from the photosensitive body 1 to an intermediate transfer belt 6. Here, the respective YMCK toner images are overlapped to form a color image. The intermediate transfer belt 6 conveys the toner images to a secondary transfer unit 7.

A sheet cassette 11 is a container for holding a large number of sheets P. A conveyance roller 12 feeds a sheet P held in the sheet cassette 11 and conveys the sheet P along a conveyance path. The image forming apparatus 30 may include two or more sheet cassettes.

The secondary transfer unit 7 transfers toner images from the intermediate transfer belt 6 to a sheet P. A fixing device 8 applies heat and pressure to the sheet P and the toner images to fix the toner images onto the sheet P. A discharge roller 17 discharges the sheet P to the inspection apparatus 50.

The inspection apparatus 50 serving as a reading apparatus is an apparatus for reading an image formed on a sheet P and inspecting the quality of the image. That is, the inspection apparatus 50 is an apparatus for inspecting whether an image formed on a sheet P satisfies inspection criteria. A sheet P on which an images is formed may be referred to as printed matter.

An image on a sheet P being conveyed at a read position by a conveyance roller 53 is read by an image sensor 54 or 55. The image sensors 54 and 55 include a light source for illuminating the sheet P and a CMOS sensor. CMOS is an abbreviation for complementary metal-oxide semiconductor.

The sheet P from which an image has been read is discharged to the stacking apparatus 60*a*. Regarding a sheet P determined to be NG (does not satisfy inspection criteria; may be referred to as failed) by the inspection apparatus 50, the control apparatus 40 controls the image forming apparatus 30 so as to form the same image on a new sheet P. A sheet sensor 56 for detecting a sheet P is provided at an inlet of the inspection apparatus 50.

The stacking apparatus 60*a* accepts the sheet P discharged from the inspection apparatus 50 at an inlet 64*a* and stacks (discharges) the sheet P on a sheet tray 61*a* or 62*a* serving as a stacking unit or discharges the sheet P from an outlet 65*a*. A sheet sensor 66*a* for detecting a sheet P is provided at the inlet 64*a*.

A conveyance path P1*a* extending from the inlet 64*a* branches out to a conveyance path P2*a* and a conveyance path P3*a* at a branching position at which a flapper F1*a* is installed. A sheet P conveyed through the conveyance path P1*a* is guided to the conveyance path P2*a* or the conveyance path P3*a* by the flapper F1*a*. The sheet tray 61*a* is provided at an outlet of the conveyance path P2*a*. The sheet tray 61*a* is a large-capacity sheet stacking tray capable of stacking a large number of sheets P. For example, a sheet P that has passed image inspection (quality inspection) may be stacked on the sheet tray 61*a*.

The conveyance path P3*a* branches out to a conveyance path P4*a* and a conveyance path P5*a* at a branching position at which a flapper F2*a* is installed. A sheet P conveyed through the conveyance path P3*a* is guided to the conveyance path P4*a* or the conveyance path P5*a* by the flapper F2*a*.

The sheet tray 62*a* is provided at an outlet of the conveyance path P4*a*. For example, a sheet P determined by the inspection apparatus 50 to have failed image quality may be stacked on the sheet tray 62*a*. However, a sheet P determined to have failed image quality may be discharged from the outlet 65*a* to a downstream apparatus (e.g., stacking apparatus 60*b*). In addition, a sheet P determined to be OK (satisfies inspection criteria; may be referred to as passed) may be stacked on the sheet tray 62*a*. The conveyance path P5*a* extends to the outlet 65*a*.

The downstream stacking apparatus 60*b* may be connected to the outlet 65*a*. Further, as in the stacking apparatus 60*b*, the outlet 65*a* may be provided with a sheet tray 69. The sheet tray 69 can also stack a sheet P determined to have failed image quality or a sheet P determined to have passed image quality. Thus, the types of sheet P to be discharged to the sheet trays 61*a*, 61*b*, 62*a*, 62*b* and 69 are determined in advance based on settings by the user.

The conveyance paths P1*a*, P2*a*, P3*a*, P4*a*, and P5*a* each are provided with one or more conveyance rollers 63*a*. The conveyance roller 63*a* conveys a sheet P from an upstream side to a downstream side in a conveyance direction of the sheet P. The conveyance roller 63*a* may be a pair of rollers consisting of two rollers for conveying a sheet P while holding the sheet P.

The stacking apparatus 60*b* accepts a sheet P discharged from the stacking apparatus 60*a* at an inlet 64*b* and stacks (discharges) the sheet P on a sheet tray 61*b*, 62*b*, or 69 serving as a stacking unit. A sheet sensor 66*b* for detecting a sheet P is provided at the inlet 64*b*.

A conveyance path P1*b* extending from the inlet 64*b* branches out to a conveyance path P2*b* and a conveyance path P3*b* at a branching position at which a flapper F1*b* is installed. A sheet P conveyed through the conveyance path P1*b* is guided to the conveyance path P2*b* or the conveyance path P3*b* by the flapper F1*b*. The sheet tray 61*b* is provided at an outlet of the conveyance path P2*b*. For example, a sheet P that has passed image inspection (quality inspection) may be stacked on the sheet tray 61*b*.

The conveyance path P3*b* branches out to a conveyance path P4*b* and a conveyance path P5*b* at a branching position at which a flapper F2*b* is installed. A sheet P conveyed through the conveyance path P3*b* is guided to the conveyance path P4*b* or the conveyance path P5*b* by the flapper F2*b*.

The sheet tray 62*b* is provided at an outlet of the conveyance path P4*b*. For example, a sheet P determined by the inspection apparatus 50 to have failed image quality may be stacked on the sheet tray 62*b*. However, a sheet P determined to have failed image quality may be discharged from an outlet 65*b* to the sheet tray 69. In addition, a sheet P determined to be OK (satisfies inspection criteria; may be referred to as passed) may be stacked on the sheet tray 62*b*. The conveyance path P5*b* extends through a post-processing unit 68 to the outlet 65*b*.

The sheet trays 61*b*, 62*b*, and 69 provided in the stacking apparatus 60*b* may be referred to as an upper tray, a middle tray, and a lower tray, respectively. The post-processing unit 68 may include a binding processor for creating a sheet bundle by bundling sheets P discharged from the stacking apparatus 60*a* and binding the sheet bundle with staples. The post-processing unit 68 may include a bookbinding processor for folding a sheet bundle in two. The post-processing unit 68 may include a cutting processor for cutting a sheet bundle.

The conveyance paths P1*b*, P2*b*, P3*b*, P4*b*, and P5*b* each are provided with one or more conveyance rollers 63*b*. The conveyance roller 63*b* conveys a sheet P from an upstream side to a downstream side in a conveyance direction of the sheet P. The conveyance roller 63*b* may be a pair of rollers consisting of two rollers for conveying a sheet P while holding the sheet P.

The number of stacking apparatuses 60 connected downstream of the inspection apparatus 50 may be one or more. The number of the sheet trays 61, 62, and 69 provided in the stacking apparatuses 60 connected downstream of the inspection apparatus 50 may be a total of two or more. The number of flappers F1 and F2 may be one or more. The flappers F1 and F2 may be referred to as guiding plates, guiding members, or branching claws.

<Controller>

Figure 2:
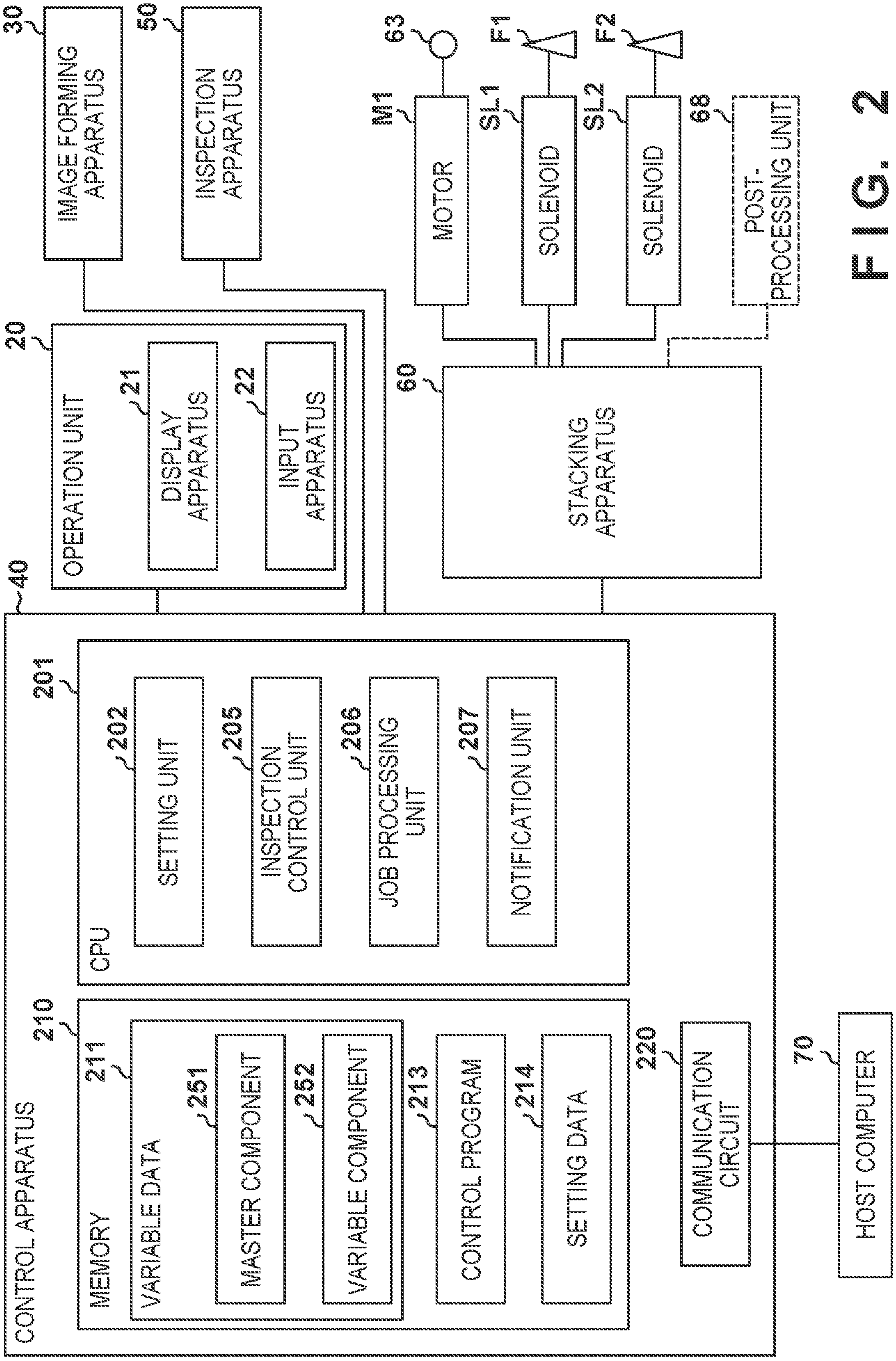
FIG. 2 is a diagram for explaining a control system.

FIG. 2 illustrates details of the control apparatus 40. A CPU 201 realizes a plurality of functions by executing a control program 213 stored in a memory 210. The CPU 201 may include a plurality of processors or CPU cores. Some or all of the plurality of functions realized by the CPU 201 may be realized by a hardware circuit different from the CPU 201.

The memory 210 is a storage apparatus including a read only memory (ROM), a random access memory (RAM), a solid state drive (SSD), a hard disk drive (HDD), and the like. A communication circuit 220 includes a network interface for connecting to a local area network and a communication interface for communicating with the image forming apparatus 30, the inspection apparatus 50, and the stacking apparatus 60.

The CPU 201 communicates with the image forming apparatus 30, the inspection apparatus 50, and the stacking apparatus 60 through the communication circuit 220. The CPU 201 communicates with a host computer 70, which is a type of information processing apparatus, through the communication circuit 220. The host computer 70 may create variable data for variable printing and transmit the variable data to the control apparatus 40.

The operation unit 20 includes a display apparatus 21 and an input apparatus 22. The operation unit 20 may have an audio circuit and a speaker for outputting a message to the user. The CPU 201 functions as a setting unit 202, an inspection control unit 205, and a job processing unit 206 according to the control program 213.

The setting unit 202 displays a print setting screen, an inspection setting screen, a variable area setting screen, and the like on the display apparatus 21 provided in the operation unit 20. The setting unit 202 accepts a setting instruction, a job execution instruction, and the like from the user through the input apparatus 22 provided in the operation unit 20. The setting unit 202 accepts, for example, inspection content (e.g., positional shift detection or black spot detection) and an inspection level. The inspection content may be referred to as an inspection item. The inspection level indicates the strictness of image inspection. The setting unit 202 stores, in the memory 210, setting data 214, which is information related to image inspection, such as the inspection content and the inspection level set by the user through the display apparatus 21.

The memory 210 further stores variable data 211 received from the host computer 70. The variable data 211 may be, for example, print data described in Personalized Print Markup Language (PPML). In this example, the variable data 211 includes a master component 251 and a variable component 252. The master component 251 includes image data that is printed in common for a plurality of sheets P. The variable component 252 includes individual pieces of image data (e.g., text, barcodes, images, etc.) that are different for each sheet P. The variable data 211 may also be utilized as comparison data (reference data or correct data) used as passing criteria in image inspection.

The inspection control unit 205 controls the inspection apparatus 50 based on the setting data 214. For example, when a request for the variable data 211 is made from the inspection apparatus 50 through the communication circuit 220, the inspection control unit 205 transmits the variable data 211 to the inspection apparatus 50. The inspection control unit 205 obtains image inspection result information from the inspection apparatus 50 serving as an inspection unit via the communication circuit 220. The inspection control unit 205 controls the flappers F1 and F2 based on the inspection result and discharges a sheet P to a sheet tray designated by the user among the sheet trays 61, 62, and 69.

The job processing unit 206 controls a print job for printing an image on a sheet P, a stacking job for stacking a sheet bundle on the stacking apparatus 60*a*, a sheet bundle post-processing job in the stacking apparatus 60*b*, and the like. The job processing unit 206 may store job data (job information) necessary for executing these jobs in the memory 210.

A notification unit 207 displays an image inspection result (e.g., pass/fail, read image, and failure cause) and the like received from the inspection apparatus 50 on the display apparatus 21. The notification unit 207 may notify the image inspection result by speech. The notification unit 207 may transmit the image inspection result to the host computer 70 by email or the like.

The stacking apparatus 60 drives a motor M1 according to a control command from the job processing unit 206 to rotate the conveyance roller 63. The stacking apparatus 60 drives solenoids SL1 and SL2 according to a control command from the job processing unit 206 to switch the flappers F1 and F2. Thus, a sheet P is guided and conveyed to either the sheet tray 61, the sheet tray 62 or a downstream stacking apparatus. For example, when a result of image inspection by the inspection apparatus 50 is NG, the job processing unit 206 controls the stacking apparatus 60 to discharge a sheet P determined to be NG on the sheet tray 62. The image forming apparatus 30 also includes a solenoid for driving a flapper and a motor for driving a conveyance roller, but these are not illustrated.

<Inspection Apparatus>

Figure 3:
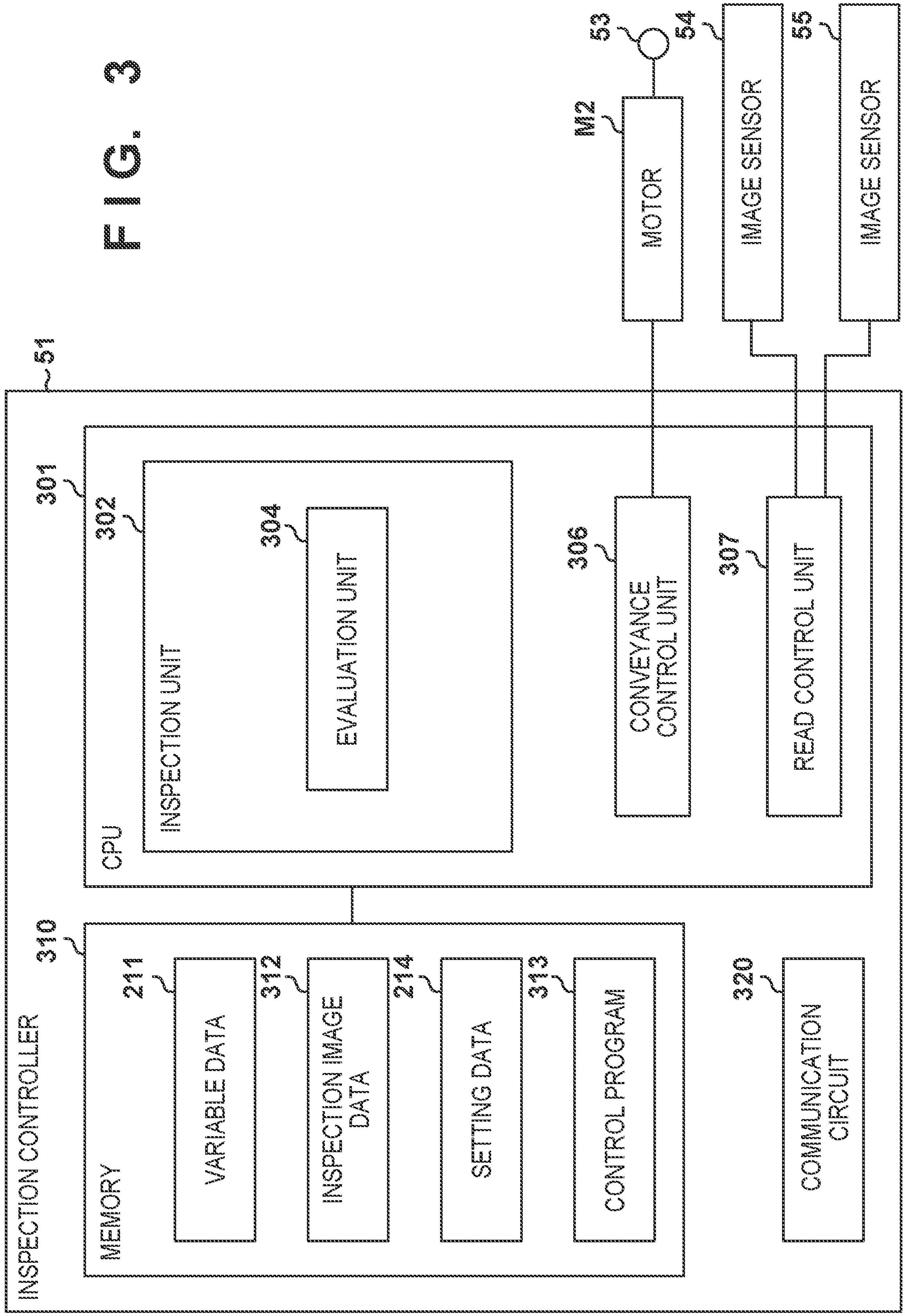
FIG. 3 is a diagram for explaining an inspection controller.

FIG. 3 illustrates details of an inspection controller 51 provided in the inspection apparatus 50. A CPU 301 realizes a plurality of functions by executing a control program 313 stored in a memory 310. Some or all of the plurality of functions may be realized by a hardware circuit different from the CPU 301.

The memory 310 is a storage apparatus including a ROM, a RAM, an SSD, an HDD, and the like. The CPU 301 is connected to the control apparatus 40 via a communication circuit 320 and receives various kinds of instructions and data and transmits inspection results. The CPU 301 stores the variable data 211 and the setting data 214 received from the control apparatus 40 via the communication circuit 320 in the memory 310.

An inspection unit 302 executes image inspection according to the setting data 214 and transmits an image inspection result to the control apparatus 40. The CPU 201 may execute the inspection, or an external PC (e.g., the host computer 70) connected to the image forming system 100 may execute the inspection. PC is an abbreviation of personal computer.

The variable data 211 is comparison data to be used in inspection of image quality. Inspection image data (read image data) 312 is image data created by the image sensor 54 or 55 reading a sheet P. The inspection image data 312 is also temporarily stored in the memory 310.

An evaluation unit 304 compares the variable data 211 with the inspection image data 312 to determine whether an image formed on a sheet P satisfies the inspection criteria.

The evaluation unit 304 may compare reference image data generated from the variable data 211 with the inspection image data 312 to determine whether an image formed on a sheet P satisfies the inspection criteria. The evaluation unit 304 may compare reference text extracted from the variable data 211 with text restored from the inspection image data 312 to determine whether an image formed on a sheet P satisfies the inspection criteria.

For example, when the inspection content is "positional shift detection", the evaluation unit 304 may make a determination of passed if the amount of shift between the position of an image of the variable data 211 and the position of an image of the inspection image data 312 is less than or equal to a predetermined value. The evaluation unit 304 may make a determination of failed if the amount of shift exceeds the predetermined value. That is, the amount of shift between the position of an image of the variable data 211 and the position of an image of the inspection image data 312 being less than or equal to the predetermined value corresponds to satisfying the inspection criteria. In addition, the amount of shift between the position of an image of the variable data 211 and the position of an image of the inspection image data 312 being greater than the predetermined value corresponds to not satisfying the inspection criteria.

For example, when the inspection content is set to "black spot detection", the evaluation unit 304 may make a determination of passed if the size of a black spot that is not present in an image of the variable data 211 and is present in an image of the inspection image data 312 is less than or equal to a determination threshold. That is, a black spot corresponds to a noise image that is not present in an image corresponding to the variable data 211 and is present in an image corresponding to the inspection image data 312 to which reduction processing has been applied. The evaluation unit 304 may make a determination of failed if the size of a black spot exceeds the determination threshold. That is, the size of a black point not exceeding the determination threshold corresponds to satisfying the inspection criteria. In addition, the size of a black point exceeding the determination threshold corresponds to not satisfying the inspection criteria.

In the present embodiment, "positional shift detection" and "black spot detection" have been described as the inspection content, but this is only one example. For example, "streak detection" or the like may be included as the inspection content. Streak detection refers to detection of a streak-like image that is not present in an original image. That is, a streak corresponds to a noise image that is not present in an image corresponding to the variable data 211 and is present in an image corresponding to the inspection image data 312 to which reduction processing has been applied. A streak may occur when a member involved in image formation needs to be cleaned, replaced or repaired. That is, determination processing for determining a "streak" serving as a degree of coincidence between an image corresponding to the variable data 211 and an image corresponding to the inspection image data 312 to which reduction processing (image processing) has been applied may be performed.

In the present embodiment, when the inspection content is "positional shift detection", inspection is performed for a relative position between an image of the variable data 211 and an image of the inspection image data 312, but this is only one example. For example, an absolute position of an image of the inspection image data 312 with respect to an edge of a sheet may be inspected. In this case, if a distance between an absolute position of an image of the variable data 211 and an absolute position of an image of the inspection image data 312 is less than or equal to a threshold, a determination of passed may be made. If the distance exceeds the threshold, a determination of failed may be made.

The evaluation unit 304 creates an inspection result indicating a determination result. The evaluation unit 304 transmits the inspection result to the control apparatus 40 and the stacking apparatus 60 via the communication circuit 320.

A conveyance control unit 306 drives a motor M2 to rotate the conveyance roller 53. A read control unit 307 controls the image sensors 54 and 55 to read a sheet P and generates the inspection image data 312. The image sensor 54 reads a first surface of the sheet P, and the image sensor 55 reads a second surface of the sheet P. Thus, the present embodiment can execute image inspection for both sides of the sheet P.

<Stacking Apparatus>

Figure 4:
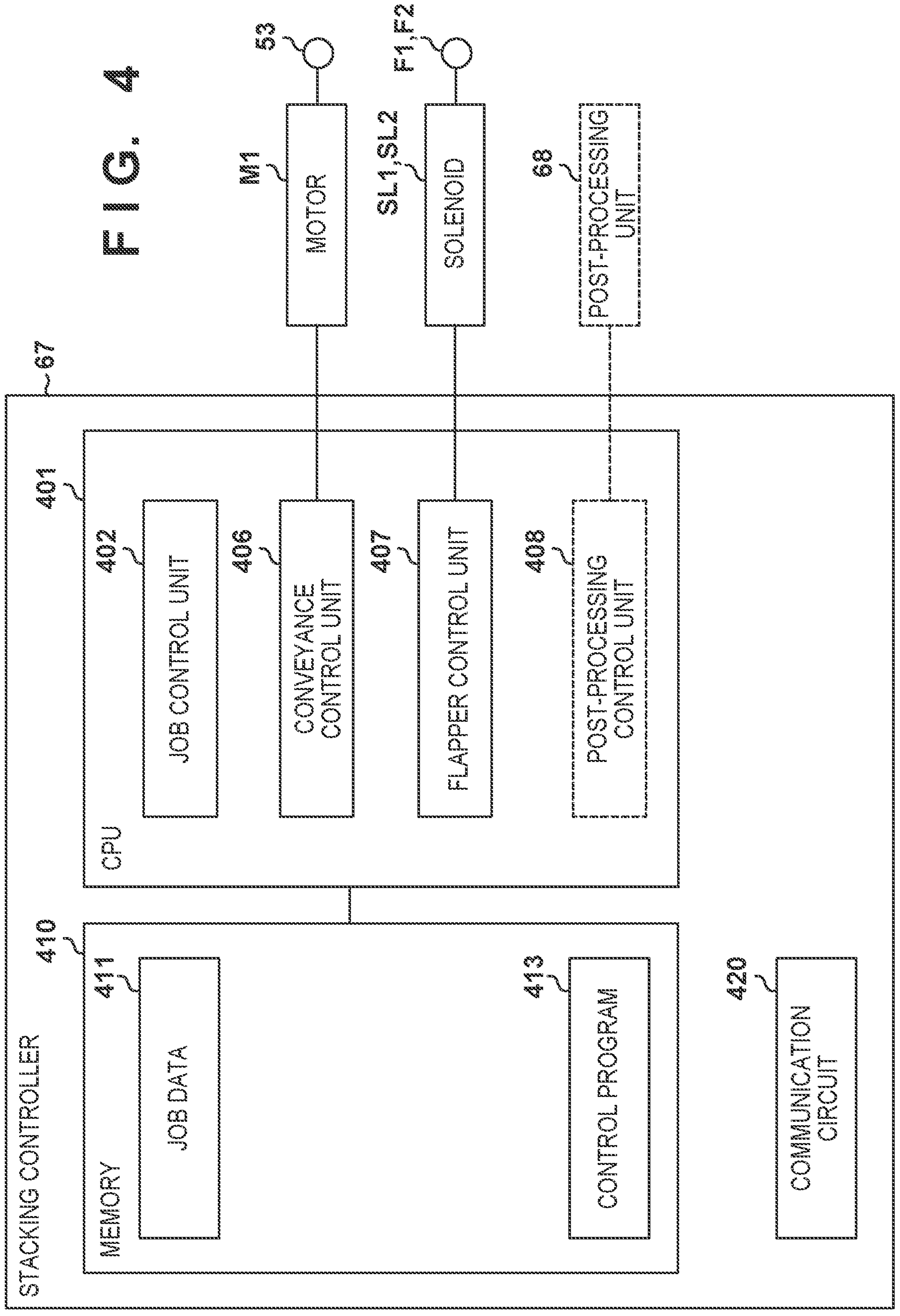
FIG. 4 is a diagram for explaining a stacking controller.

FIG. 4 illustrates details of a stacking controller 67 provided in the stacking apparatus 60. A CPU 401 realizes a plurality of functions by executing a control program 413 stored in a memory 410. Some or all of the plurality of functions may be realized by a hardware circuit other than the CPU 401.

The memory 410 is a storage apparatus including a ROM, a RAM, an SSD, an HDD, and the like. The CPU 401 is connected to the control apparatus 40 via a communication circuit 420 and receives various kinds of instructions and data and transmits execution results.

A job control unit 402 executes job data 411 received from the control apparatus 40 via the communication circuit 420. The job data 411 includes, for example, information indicating content of a job. The job data 411 is temporarily stored in the memory 410.

A conveyance control unit 406 starts rotation of the motor M1 according to a rotation command received from the control apparatus 40. The conveyance control unit 406 stops rotation of the motor M1 according to a stop command received from the control apparatus 40. Thus, the conveyance roller 63 driven by the motor M1 is rotated or stopped.

A flapper control unit 407 switches the flappers F1 and F2 by driving the solenoids SL1 and SL2 according to a switch command received from the control apparatus 40 for each sheet P. Thus, a discharge destination of a sheet P is determined. The flappers F1 and F2 may be controlled based on an inspection result received from the inspection apparatus 50 instead of a switch instruction received from the control apparatus 40.

When the stacking apparatus 60*b* is a post-processing apparatus, the stacking apparatus 60*b* includes a post-processing control unit 408. The post-processing control unit 408 controls the post-processing unit 68 according to a post-processing execution command received from the control apparatus 40.

<Setting Screen (User Interface)>

(1) Print Setting Screen

Figure 5:
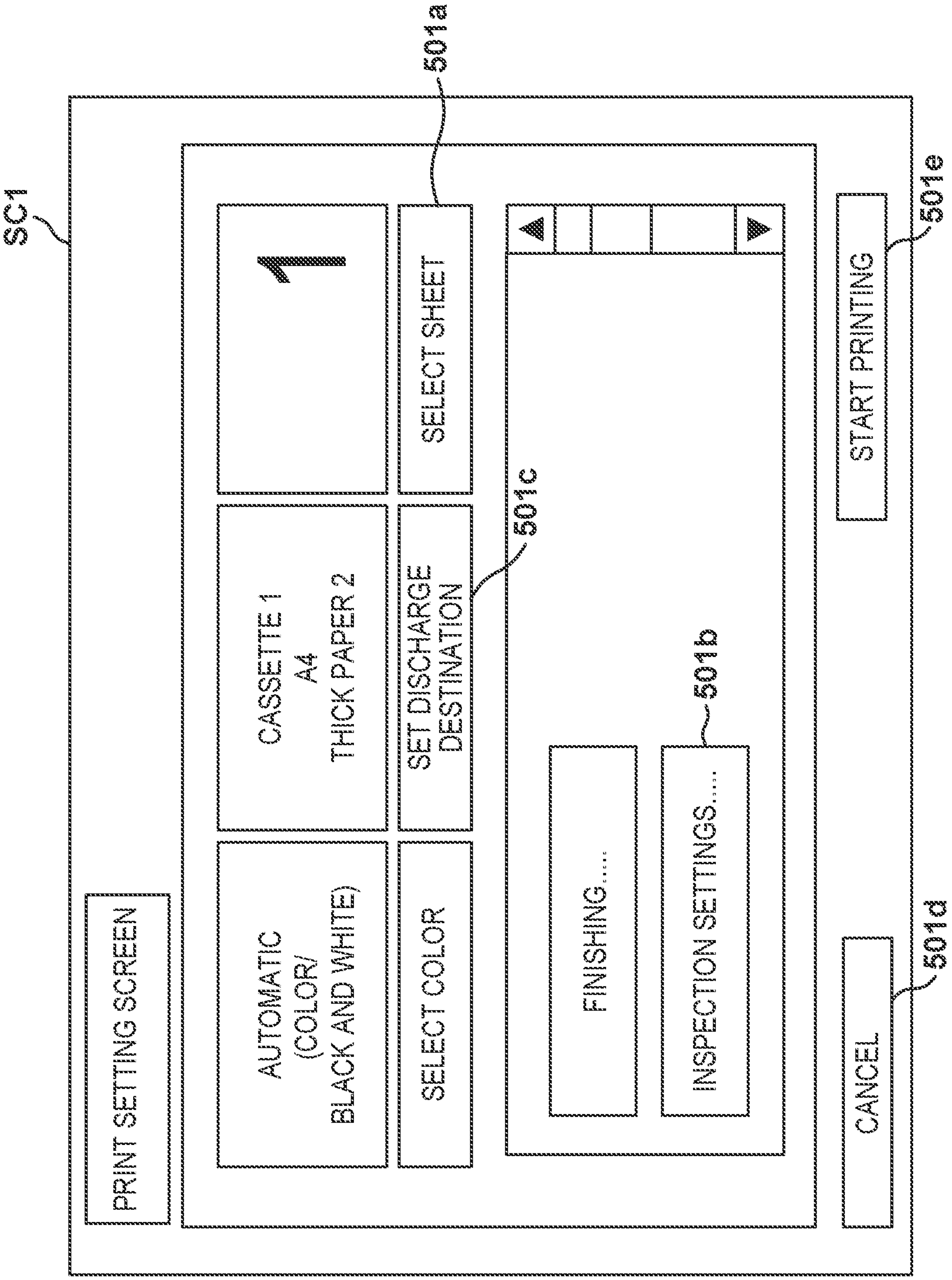
FIG. 5 is a diagram for explaining a print setting screen.

FIG. 5 illustrates a print setting screen SC1. The print setting screen SC1 may be referred to as a job input screen. A button 501*a* is a button for executing designation of the sheet cassette 11, a grammage, and a size of a sheet P to be printed (including a length of a sheet in a conveyance direction). A button 501*b* is a button for instructing transition from the print setting screen SC1 to an inspection setting screen SC2. A button 501*c* is a button for instructing transition from the print setting screen SC1 to a discharge destination setting screen. In the discharge destination setting screen, a discharge destination of an NG sheet and a discharge destination of an OK sheet are set. A button 501*d* is a button for instructing cancellation of setting content. When the button 501*d* is operated by an operator (user), a predetermined initial screen is transitioned to. A button 501*e* is a button for instructing the start of printing.

(2) Inspection Setting Screen

Figure 6:
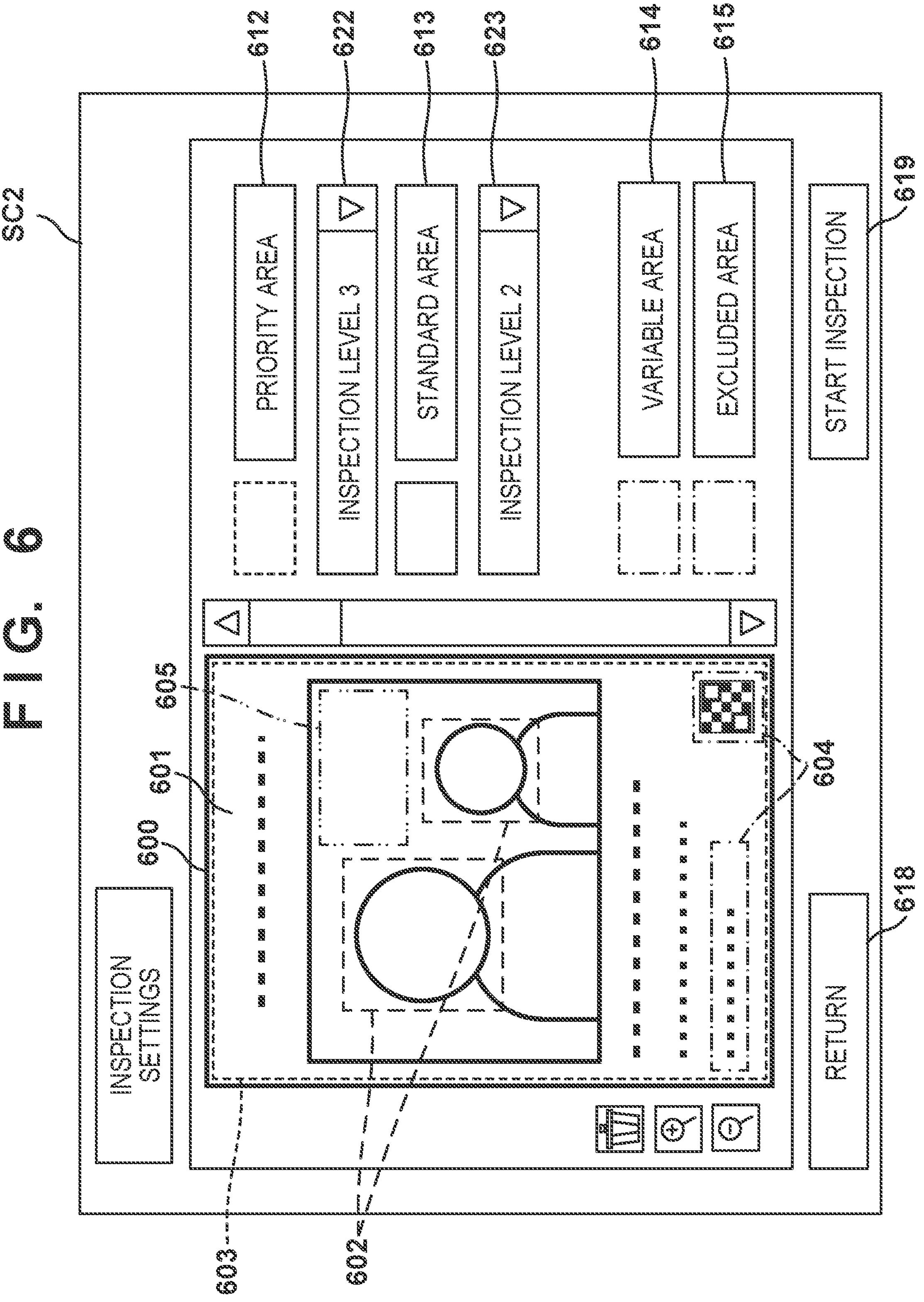
FIG. 6 is a diagram for explaining an inspection setting screen.

FIG. 6 illustrates the inspection setting screen SC2. The inspection setting screen SC2 is a screen for accepting an instruction from the operator for setting an inspection area in which quality inspection by the inspection apparatus 50 is to be executed. A display area 600 displays a print target image 601, inspection areas 602 to 604, an excluded area 605, and the like.

The inspection areas 602 to 604 and the excluded area 605 are set through a mouse or a touch panel, which is part of the input apparatus 22. The inspection areas 602 are priority areas set by operating a button 612. A priority area is, for example, an inspection area in which accurate inspection is to be executed. In this example, headshots surrounded by dashed frames are inspected with priority. A menu 622 is a pull-down menu for setting an inspection level (inspection accuracy) to be applied to the inspection areas 602. A pull-down menu may be called a drop-down list. In this example, the lowest inspection accuracy is an inspection level 1, and the inspection accuracy increases as the numeral of the inspection level increases.

The inspection area 603 is a standard area set by operating a button 613. A standard area is, for example, an inspection area in which standard content inspection is to be executed. A menu 623 is a pull-down menu for setting an inspection level (inspection accuracy) to be applied to the inspection area 603. In this example, the lowest inspection accuracy is the inspection level 1, and the inspection accuracy increases as the numeral of the inspection level increases.

The inspection areas 604 are set by operating a button 614. The inspection areas 604 are variable areas in which variable components are printed. As will be described later with reference to FIG. 7 and the like, the variable areas (inspection areas 604) are set in a variable area setting screen SC3.

The excluded area 605 is set by operating a button 615 and is an area in which inspection is not executed. In this example, it is not necessary to perform accurate inspection for a background image surrounded by a two-dot dashed line. Therefore, the background image may be set to be the excluded area 605.

Thus, an inspection level can be set for each area included in a print target. Therefore, the user can set appropriate passing criteria. As a result, a printed matter of acceptable quality is determined to be passed, and thus, unnecessary reprinting is reduced and productivity is increased. The unnecessary discarding of sheets P is also reduced.

A button 618 is a button for instructing return to the print setting screen SC1, which is a previous screen. The button 618 may be implemented as a cancel button. In this case, when the button 618 is pressed, inspection settings inputted through the inspection setting screen SC2 are discarded. When the button 618 is implemented as a cancel button, an OK button for applying inspection settings and returning to the print setting screen SC1 is also implemented. A button 619 is a button for instructing the start of inspection.

(3) Variable Area Setting Screen

Figure 7:
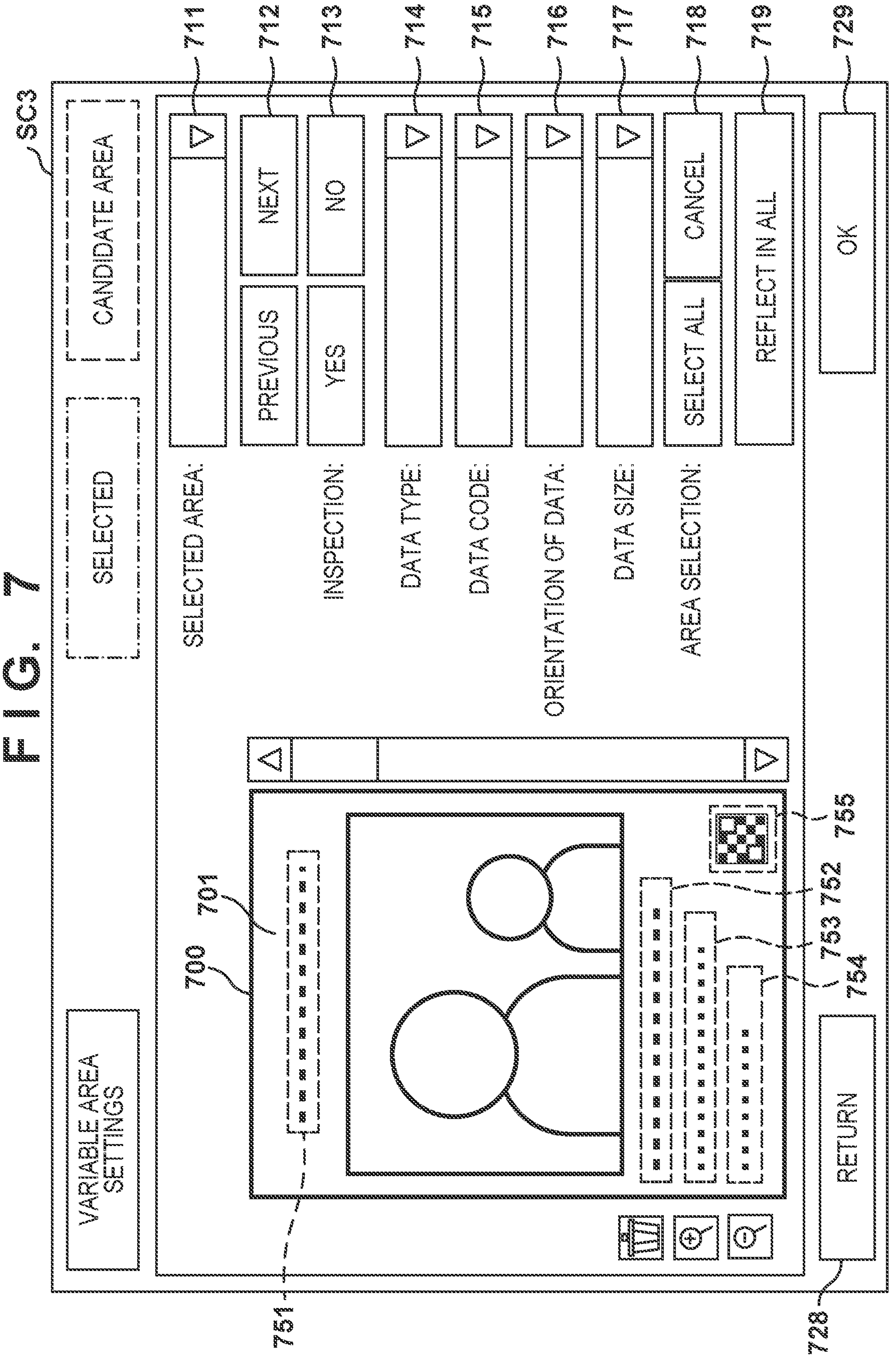
FIG. 7 is a diagram for explaining a variable area setting screen.

FIG. 7 illustrates the variable area setting screen SC3. A variable area refers to an area in which print content is replaced for each sheet P in an image to be formed on a sheet in variable printing. In the variable area, a variable component image, such as text (letters, numbers), a barcode, or a photographic image that is different for each sheet P, is formed. The CPU 201 (job processing unit 206) of the control apparatus 40 analyzes the variable data 211, places the master component 251 in a master area, and places the variable component 252 in a variable area to create print image data (bitmap data). The variable data 211 is described in PPML or the like. Therefore, by analyzing the variable data 211, the CPU 201 can identify the type (text, barcode, or image) of the master component 251 and its print coordinates, and the type of the variable component 252 and its print coordinates. The job processing unit 206 forms a print image on a sheet P by transmitting print image data to the image forming apparatus 30.

The inspection unit 302 of the inspection apparatus 50 compares reference image data (variable data 211 or print image data) and the inspection image data 312. Furthermore, the inspection unit 302 executes specific inspection on a variable area set in the variable area setting screen SC3. This specific inspection identifies the information type (information content, such as text, barcode, or image) of the variable area. The inspection unit 302 determines whether the information content associated with the variable area coincides with the variable component in the reference image data. For example, if the information type of the variable area is text, the inspection unit 302 applies OCR to a read image of the variable area and restores text (character string). OCR is an abbreviation for optical character recognition. Thus, the inspection unit 302 determines whether the text of the variable component 252 coincides with the restored text.

When the information type of the variable area is a barcode (e.g., one-dimensional barcode or two-dimensional barcode), the inspection unit 302 executes decoding processing on a read image of the variable area and restores a character string. Further, the inspection unit 302 executes decoding processing on a barcode image included in the variable component 252 and restores an original character string. The inspection unit 302 compares the original character string with the character string restored from the read image.

In FIG. 7, the variable area setting screen SC3 accepts an instruction from the user for setting a variable area to be inspected. An image display area 700 displays a print image 701 and candidate areas. The candidate areas 751 to 755 are variable areas surrounded by dashed lines and are areas that can be selected as inspection areas. In addition, the candidate areas 751 to 755 are areas in which image inspection can be executed. The setting unit 202 identifies print coordinates of the variable component 252 by analyzing the variable data 211 and displays candidate areas 751 to 755 based on the print coordinates.

A button 711 is a button for displaying identification information of a candidate area of interest among a plurality of candidate areas. The button 711 may be implemented as a pull-down menu for displaying a list including the plurality of candidate areas. A button 712 is a button for switching the candidate area selected through the button 711 when there are a plurality of candidate areas. Each time the button 712 is pressed, the candidate area displayed on the button 711 changes (e.g., area I⇒area II⇒area III⇒ . . . ). An emphasized display of a candidate area in the image display area 700 is also switched in conjunction.

A button 713 is a button for determining or selecting the candidate area selected using the button 711 as an inspection area. The button 713 may include a button for explicitly instructing to select the area as an inspection area and a button for explicitly instructing not to select the area as an inspection area.

A button 714 is a button for designating the type (text, barcode, or image) of information to be printed in the candidate area. A button 715 is a button for designating data code (e.g., name of font) to be printed in the candidate area. A button 716 is a button for designating an orientation of information to be printed in the candidate area. A button 717 is a button for designating a size of information (e.g., size of text) to be printed in the candidate area. The buttons 714 to 717 may be displayed to be inoperable when none of the candidate areas is selected as an inspection area.

A button 718 is a button for selecting all of the candidate areas selectable as an inspection area or for cancelling a selected candidate area from being an inspection area. A button 719 is a button for reflecting settings selected using the buttons 714 to 716 in all of the selected candidate areas (inspection areas). For example, all areas are selected using the button 718, inspection parameters are set using the buttons 714 to 717, and the same inspection parameters are reflected in all areas using the button 719.

A button 728 is a button for instructing to discard setting content set in the variable area setting screen SC3 and returning to the inspection setting screen SC2. A button 729 is a button for instructing to store setting content set in the variable area setting screen SC3 in the memory 210 as the setting data 214.

Figure 8:
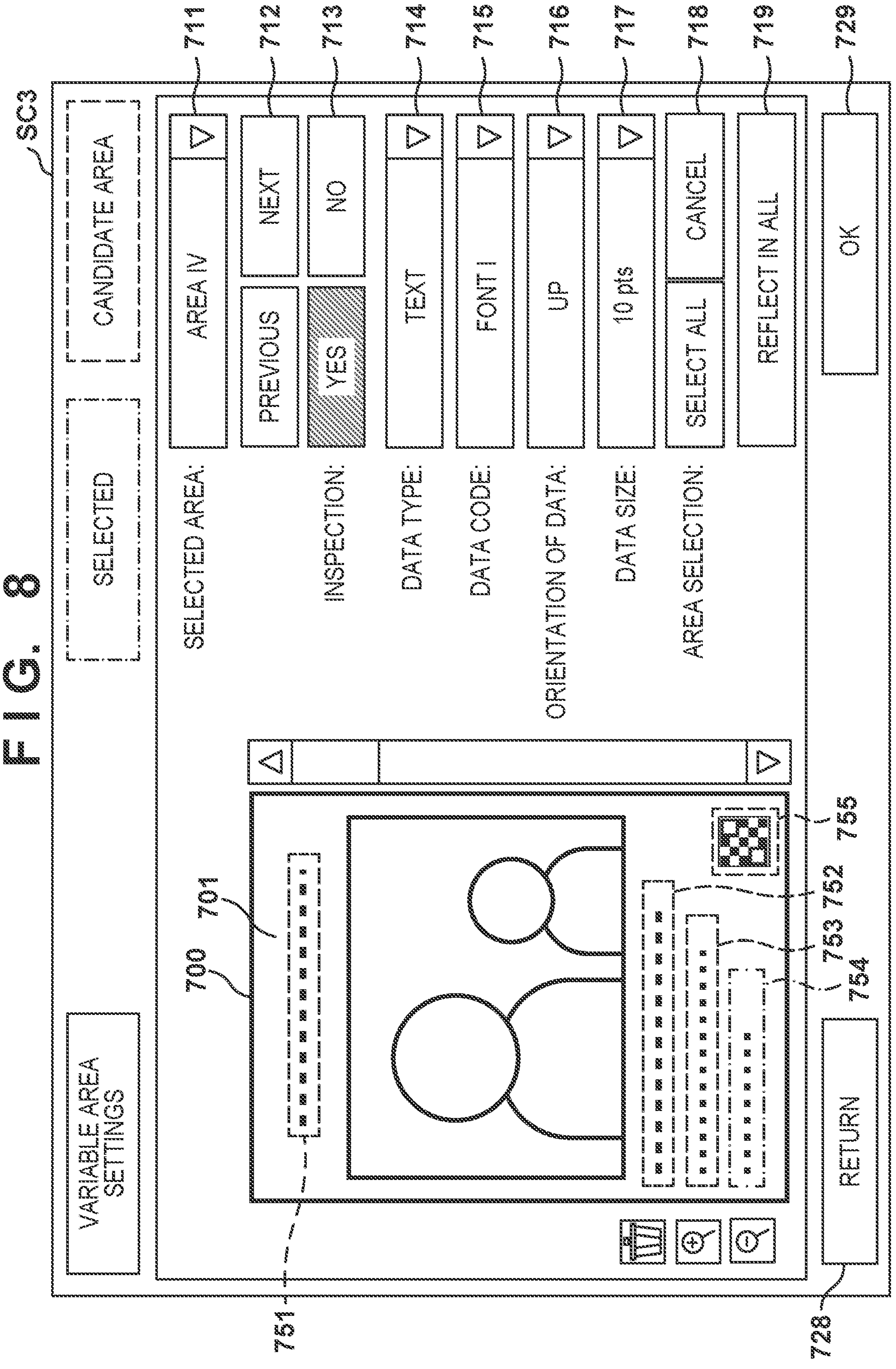
FIG. 8 is a diagram for explaining the variable area setting screen.

FIG. 8 illustrates that area IV has been selected from among five candidate areas as an example. Here, area IV is identification information (name) given to a certain candidate area. The candidate area 754 indicated by a one-dot dashed line in the image display area 700 is area IV selected using the button 711 or the button 712. By operating the button 713, the user selects whether to perform inspection for the selected area IV. In particular, in FIG. 8, "execute inspection" is selected using the button 713.

Regarding the type of data to be formed in area IV, "text" is selected using the button 714. When the type is one-dimensional barcode, "one-dimensional barcode" is selected. When the type is two-dimensional barcode, "two-dimensional barcode" is selected.

Regarding the code of data to be formed in area IV, "font I" is selected using the button 715. The code of data is, for example, information related to the font of text. When the button 715 is to be implemented using a pull-down menu, a list of the pull-down menu will list identification information of a plurality of fonts held in the inspection apparatus 50.

Regarding the orientation of data to be formed in area IV, "up" is selected using the button 716. As the orientation of data, "down", "right", "left", or the like may be selectable.

Regarding the size of data to be formed in area IV, "10 pts" is selected using the button 717. Here, pts is a unit indicating a font size.

Figure 9:
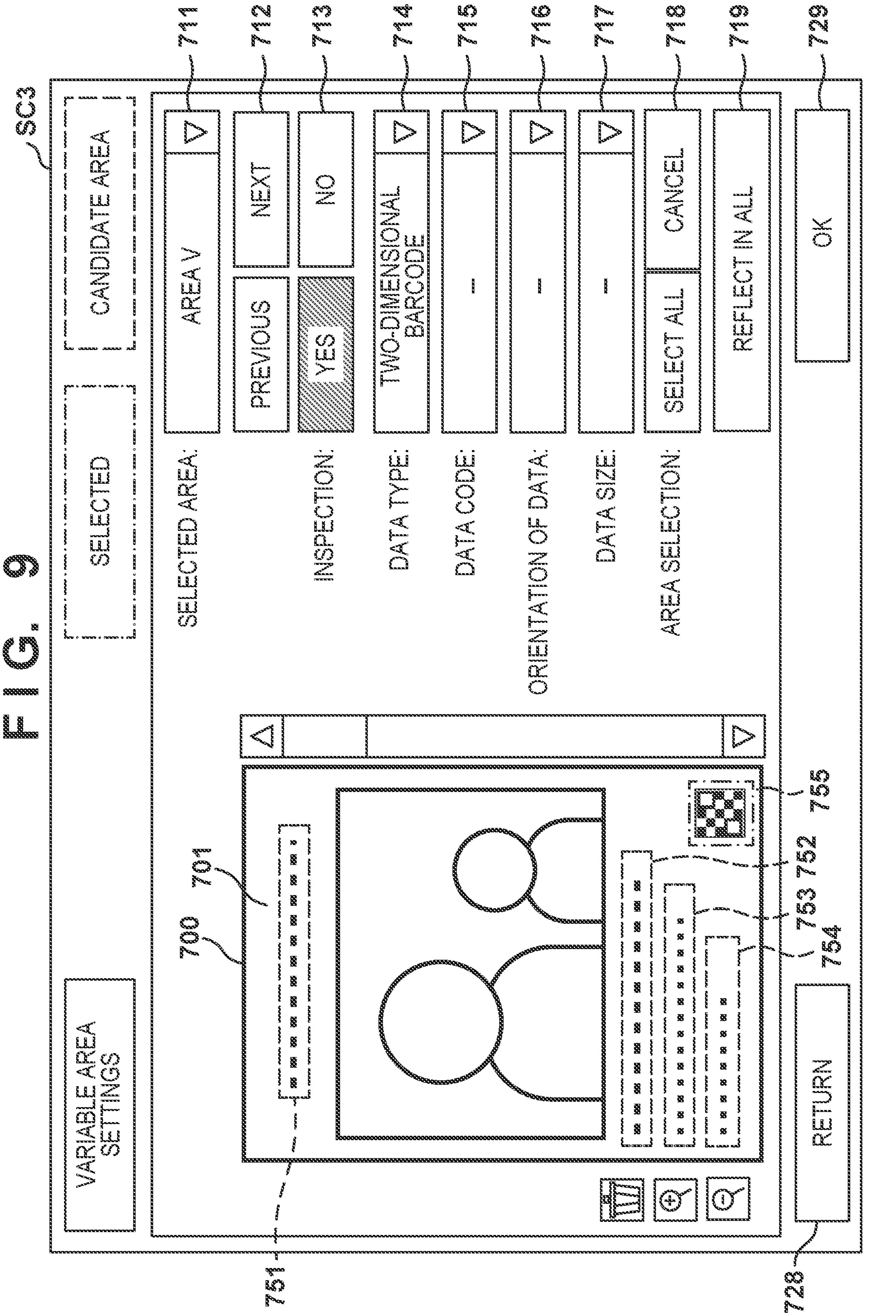
FIG. 9 is a diagram for explaining the variable area setting screen.

FIG. 9 illustrates inspection settings for an area V in which a two-dimensional barcode is formed among a plurality of candidate areas as an example. A two-dimensional barcode is formed in area V. Therefore, it is not necessary to set data code using the button 715, set an orientation of data using the button 716, or set a data size using the button 717. When a two-dimensional barcode is selected using the button 714, the setting unit 202 displays the buttons 715 to 717 to be inoperable. The button 716 for setting an orientation of data may be displayed to be operable.

Figure 10:
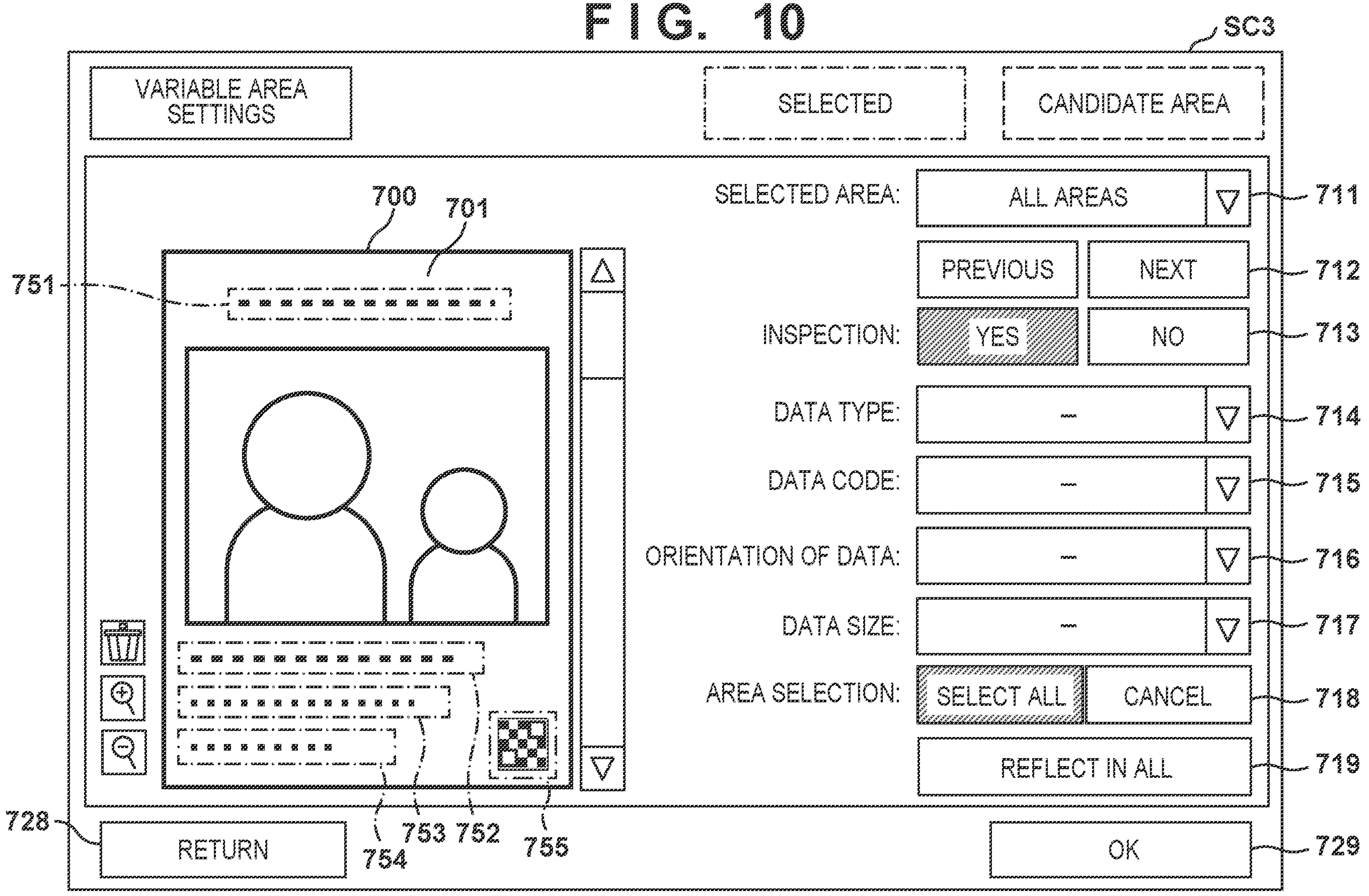
FIG. 10 is a diagram for explaining the variable area setting screen.

FIG. 10 illustrates that all of a plurality of candidate areas has been selected using the button 718 as an example. By operating the button 719, the user can perform inspection settings simultaneously for all candidate areas selected using the button 718. However, recommended setting content for each candidate area may be different depending on the attribute (information type) of the selected candidate area. For example, assume that a candidate area whose data type is text and a candidate area whose data type is two-dimensional barcode are selected. In this case, the setting unit 202 displays on the variable area setting screen SC3 only buttons corresponding to items that can be set in common for both candidate areas. In this case, because there are no items that can be set in common for both candidate areas, only the button 713 is displayed to be operable.

In FIGS. 6 to 10, candidate areas and inspection areas are indicated by a dashed frame or a one-dot dashed frame, but this is only one example. For example, a color of a frame indicating a candidate area may be different from a color of a frame indicating an inspection area. Alternatively, the inside of a frame may be filled with a specific color. In this case, a color of a candidate area is selected to be different from a color of an inspection area. A plurality of candidate areas and a selected candidate area (inspection area) may be distinguished by such emphasized display or identification display according to color.

<Functions of CPU>

Figure 11:
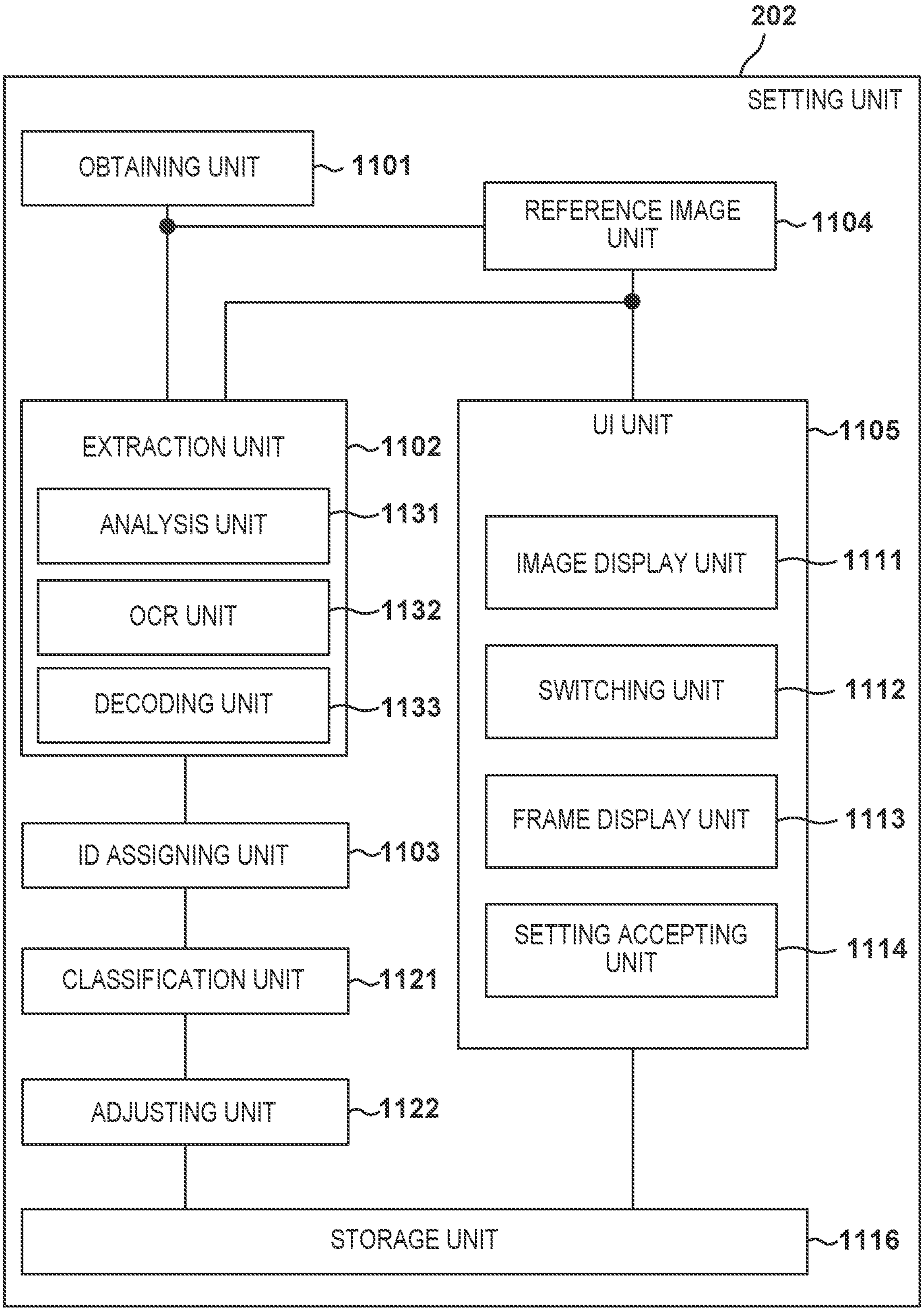
FIG. 11 is a block diagram illustrating a setting unit.

FIG. 11 illustrates functions of the setting unit 202 realized by the CPU 201. An obtaining unit 1101 obtains the variable data 211 from the host computer 70 or the like. The obtaining unit 1101 may read out the variable data 211 from the memory 210. An extraction unit 1102 extracts a variable area by analyzing the variable data 211. For example, an analysis unit 1131 of the extraction unit 1102 obtains the print coordinates of a variable area by analyzing the variable component 252 in the variable data 211. An OCR unit 1132 executes OCR on reference image data (print image data) generated from the variable data and extracts an area in which text is to be printed. The area in which text is to be printed is an example of a variable area. A decoding unit 1133 extracts a barcode area by executing decoding processing on the reference image data (print image data) and decoding text. A barcode area is also an example of a variable area.

An ID assigning unit 1103 assigns an ID (identification information) to an extracted variable area. For example, IDs, such as area I, area II, . . . , area V, are assigned. The coordinates of a variable area may be associated with an ID and stored in the memory 210.

A classification unit 1121 classifies an information attribute of the variable component 252 into either text, barcode, or image based on an analysis result for the variable component 252. An adjusting unit 1122 adjusts operability/inoperability of the button 714 to 717. For example, the adjusting unit 1122 may adjust the number or content of inspection parameters that can be set by the user for a candidate area according to the classification result by the classification unit 1121. In other words, the adjusting unit 1122 determines an inspection parameter that can be set by the user and an inspection parameter that cannot be set by the user among the data type, the data code, the orientation of data, and the data size. Among the buttons 714 to 717, a button corresponding to an inspection parameter that cannot be set may be grayed out.

A reference image unit 1104 generates reference image data based on the variable data 211. The reference image data is displayed on the image display area 700 and is used as image data for comparison in the inspection unit 302.

A UI unit 1105 generates and displays the print setting screen SC1, the inspection setting screen SC2, and the variable area setting screen SC3 on the display apparatus 21. An image display unit 1111 displays the print image 701, which is based on reference image data, in the image display area 700. A switching unit 1112 switches a candidate area (inspection area) displayed on the button 711 in response to operation of the button 712. That is, the switching unit 1112 monitors operation of the buttons 711, 712, and 718 and identifies or switches a candidate area selected by the user. A frame display unit 1113 displays a frame in the image display area 700 based on the print coordinates of a candidate area extracted by the extraction unit 1102. The frame display unit 1113 displays the frame of a candidate area currently selected by the switching unit 1112 so as to be distinguishable from the frame of a non-selected candidate area. This distinction may be realized by changing the line type of the frame, changing the color of the line of the frame, or changing the color that fills the inside of the frame.

A setting accepting unit 1114 sets a selected candidate area as an inspection area or sets inspection parameters in response to operation of the buttons 713 to 717. A storage unit 1116 creates the setting data 214 including reference image data, coordinate data of a variable area, and inspection parameters accepted through the setting accepting unit 1114 and stores these in the memory 210.

Thus, according to the first embodiment, the user can select as an inspection area a variable area for which image inspection is desired from variable areas (candidate areas) extracted from the variable data 211. Therefore, errors in inspection settings for variable printing are reduced. That is, it is possible to improve the usability for when performing settings for inspection of an image on a sheet.

<Flowchart for Setting>

Figure 12:
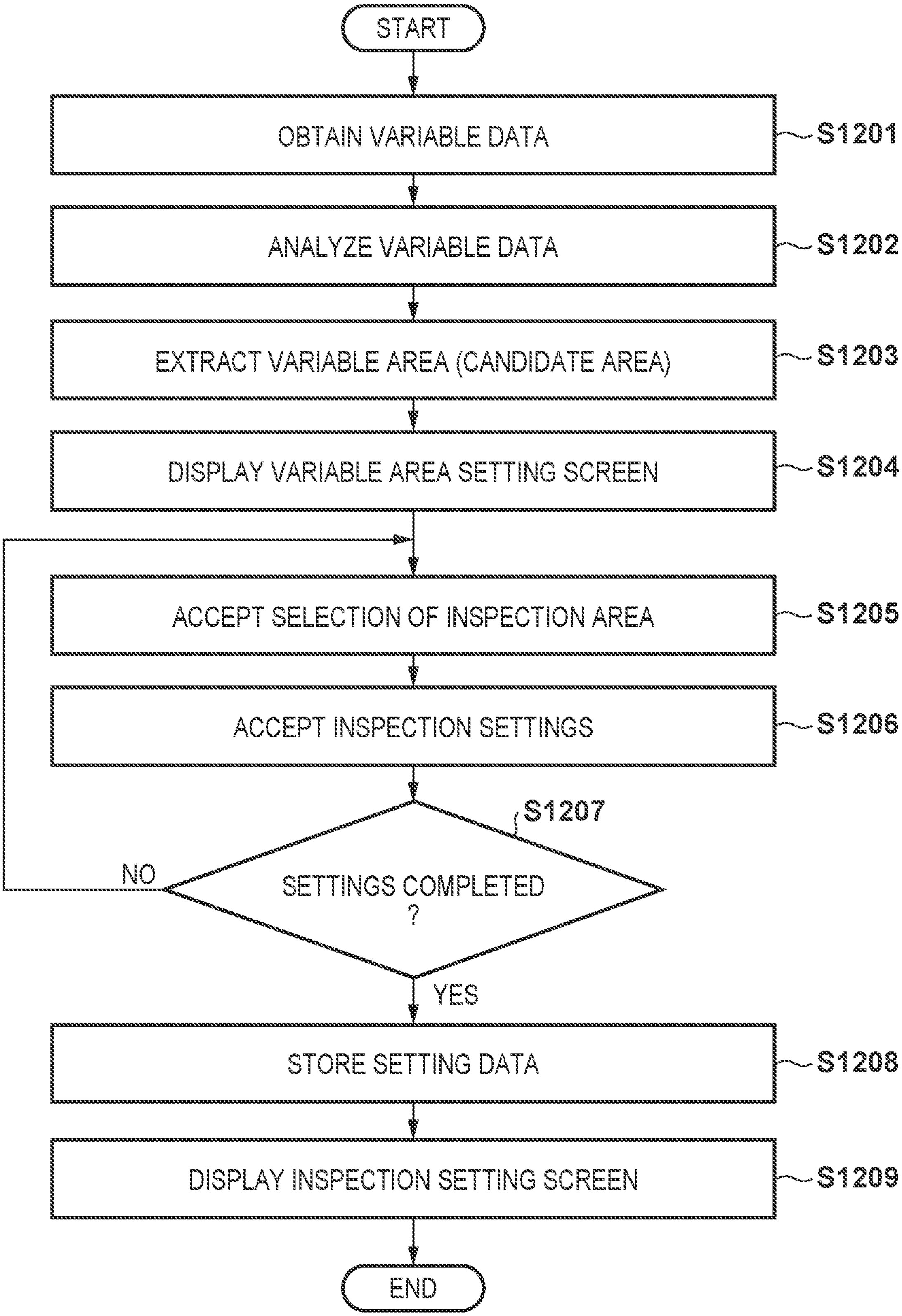
FIG. 12 is a flowchart for explaining a setting method.

FIG. 12 illustrates setting processing to be executed by the CPU 201 of the control apparatus 40 according to the control program 213. When the button 614 is operated, the CPU 201 executes the following processing.

In step S1201, the CPU 201 (obtaining unit 1101) obtains the variable data 211 from the host computer 70 or the memory 210.

In step S1202, the CPU 201 (analysis unit 1131) analyzes the variable data 211.

In step S1203, the CPU 201 (extraction unit 1102) extracts a variable area based on an analysis result. As described above, the variable data 211 is described in PPML or the like, and the CPU 201 can identify content of the master component 251 and its print coordinates and content of the variable component 252 and its print coordinates. In particular, the content of the variable component 252 and its print coordinates are extracted as definition information defining a variable area. The CPU 201 may assign identification information to each extracted variable area.

In step S1204, the CPU 201 (UI unit 1105) creates the variable area setting screen SC3 and displays the variable area setting screen SC3 on the display apparatus 21.

In step S1205, the CPU 201 (setting accepting unit 1114) accepts selection of an inspection area from a plurality of variable areas (candidate areas). As described above, at least one candidate area to be an inspection area is selected from a plurality of candidate areas using the buttons 711 to 713 and 718.

In step S1206, the CPU 201 (setting accepting unit 1114) accepts inspection settings through the variable area setting screen SC3. The inspection settings include inspection parameters designated through the buttons 714 to 717. The inspection settings may include text obtained from the variable component 252 corresponding to a variable area, a character string restored from a barcode, and the like as correct data.

In step S1207, the CPU 201 (setting accepting unit 1114) determines whether settings are completed. For example, when the button 729 is pressed, the CPU 201 determines that settings are completed. In this case, the CPU 201 proceeds to step S1208. Meanwhile, if the button 729 has not been pressed, the CPU 201 determines that it is not the end of setting and proceeds to step S1205.

In step S1208, the CPU 201 (storage unit 1116) stores the setting data 214 in the memory 210. In step S1209, the CPU 201 (UI unit 1105) displays the inspection setting screen SC2 on the display apparatus 21.

<Flowchart for Image Inspection>

Figure 13:
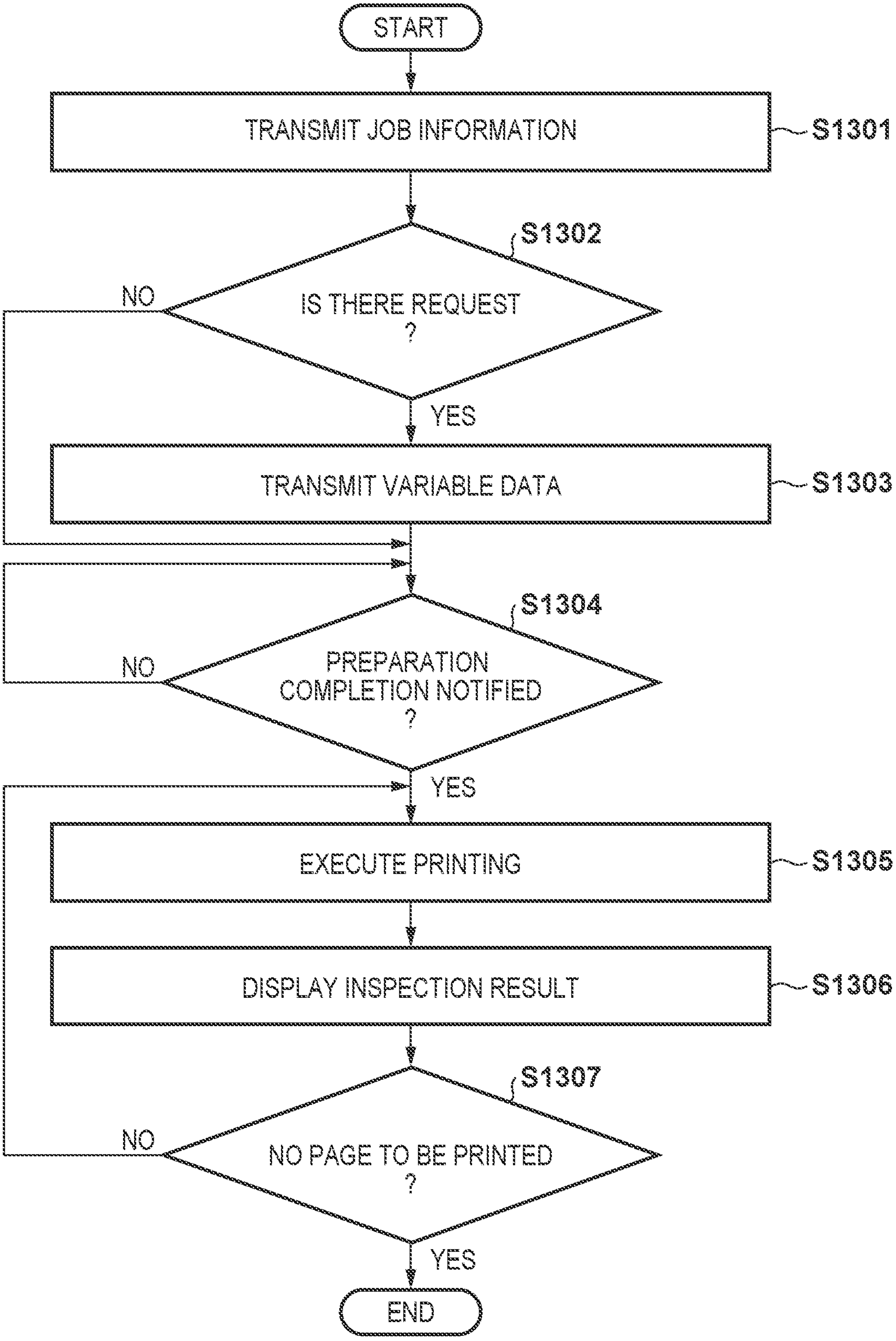
FIG. 13 is a flowchart for explaining a print method.

FIG. 13 is a flowchart for explaining print processing to be executed by the CPU 201 of the control apparatus 40. The CPU 201 executes the following processing when the button 501*e* is pressed and the start of printing is instructed.

In step S1301, the CPU 201 (job processing unit 206) creates job information including sheet information, inspection settings, discharge destination information, and the like based on the setting data 214 and transmits the job information to the inspection apparatus 50. The sheet information includes the size and number of sheets P and the like. The inspection settings include whether to execute inspection and the content of inspection (inspection area, inspection level, etc.) to be executed by the inspection apparatus 50. The discharge destination information includes identification information of one stacking apparatus to be a discharge destination among the stacking apparatuses 60*a* and 60*b*, and the identification information of an OK tray and an NG tray. The OK tray is a sheet tray on which a sheet P that has passed the inspection is discharged. The NG tray is a sheet tray on which a sheet P that has not passed the inspection is discharged.

In step S1302, the CPU 201 (inspection control unit 205) determines whether a request requesting transmission of reference image data and the variable data 211 has been received from the inspection apparatus 50. If no request is received, the CPU 201 advances the processing to step S1304. If a request is received, the CPU 201 advances the processing to step S1303.

In step S1303, the CPU 201 (inspection control unit 205) reads out reference image data and the variable data 211 from the memory 210 and transmits these to the inspection apparatus 50.

In step S1304, the CPU 201 (job processing unit 206) determines whether preparation completion has been notified from the inspection apparatus 50. When preparation completion is notified from the inspection apparatus 50, the CPU 201 advances the processing to step S1305.

In step S1305, the CPU 201 (job processing unit 206) controls the image forming apparatus 30 and executes printing on a sheet P. The sheet P is discharged from the image forming apparatus 30 to the inspection apparatus 50.

In step S1306, the CPU 201 (notification unit 207) receives an inspection result from the inspection apparatus 50 and displays the inspection result on the display apparatus 21. The notification unit 207 receives the inspection image data 312 from the inspection apparatus 50 and displays a read image on the display apparatus 21 based on the inspection image data 312. Furthermore, the notification unit 207 may display on the display apparatus 21 which inspection area of the plurality of inspection areas has failed in a superimposed manner on the read image. For example, the notification unit 207 may display a failed variable area among a plurality of variable areas in an emphasized manner. The emphasized display may be, for example, performing display by superimposing a conspicuously colored frame on the failed variable area. Further, the notification unit 207 may display a reason for failure, (e.g., OCR failure, barcode decoding failure, occurrence of a black spot, occurrence of a black streak image, etc.) on the display apparatus 21.

If an inspection result indicates a failure, the CPU 201 (job processing unit 206) may execute a job for a failed page again.

In step S1307, the CPU 201 (job processing unit 206) determines whether there is a page to be printed based on the print job. That is, the CPU 201 determines whether printing has been completed for all the pages. If there are pages to be printed, the CPU 201 advances the processing to step S1305 and executes printing of the next page. If there are no pages to be printed, the CPU 201 ends the print job.

Figure 14:
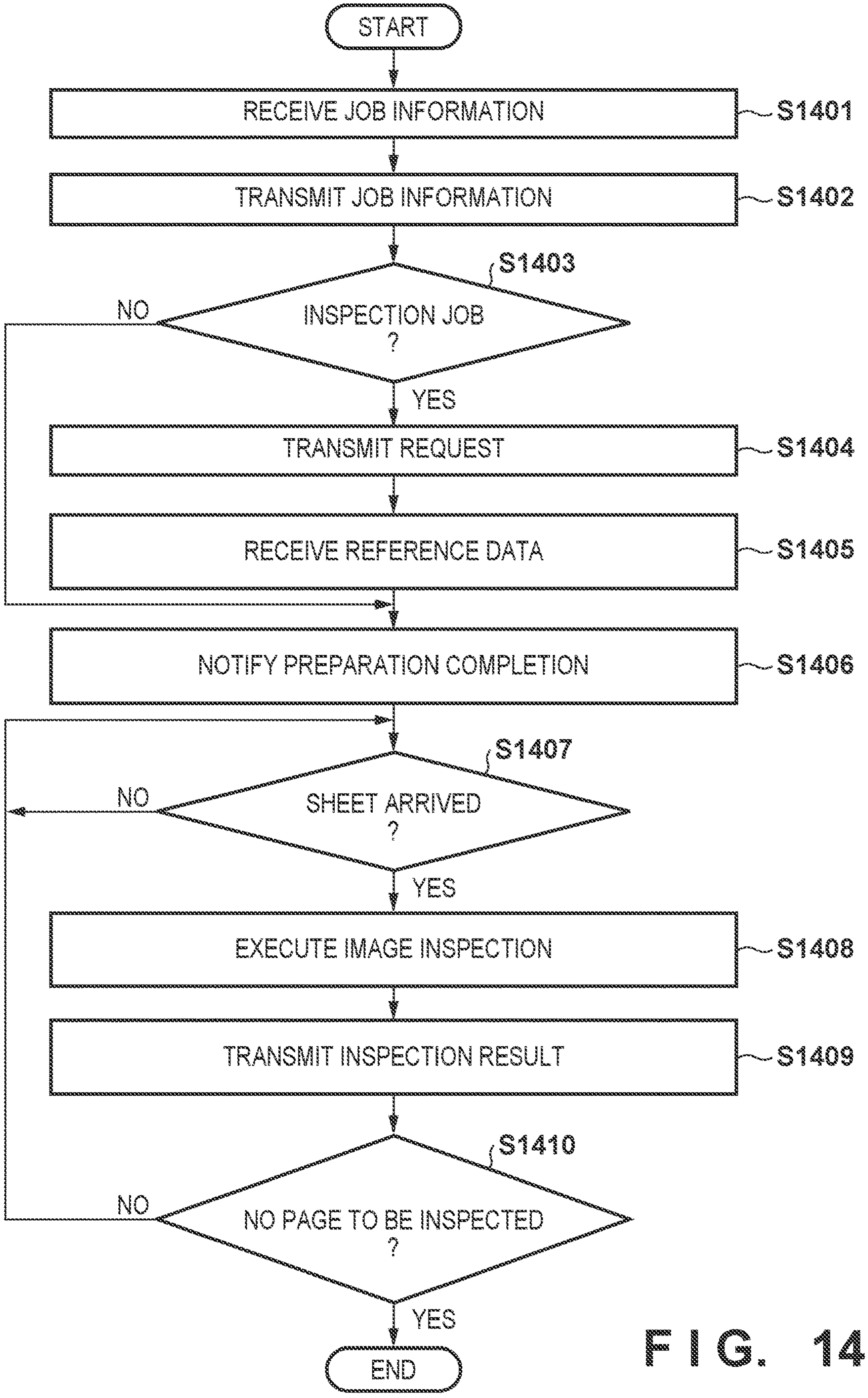
FIG. 14 is a flowchart for explaining an inspection method.

FIG. 14 is a flowchart for explaining inspection processing to be executed by the CPU 301 of the inspection apparatus 50.

In step S1401, the CPU 301 receives job information from the control apparatus 40. The job information may be stored in the memory 310. Alternatively, the job information may be stored in the memory 310 as part of the setting data 214.

In step S1402, the CPU 301 transmits the job information to the stacking apparatus 60*a* connected downstream of the inspection apparatus 50.

In step S1403, the CPU 301 analyzes the job information and determines whether the job information indicates that an inspection job is to be executed. When an inspection job is not instructed, the inspection apparatus 50 executes a conveyance job for conveying a sheet P to the downstream stacking apparatus 60*a*. If an inspection job is instructed, the CPU 301 advances the processing to step S1404. If an inspection job is not instructed, the CPU 301 advances the processing to step S1406.

In step S1404, the CPU 301 transmits a request requesting reference image data and the variable data 211 to the control apparatus 40.

In step S1405, the CPU 301 receives the reference image data and the variable data 211 from the control apparatus 40. The reference image data and the variable data 211 are stored in the memory 310.

In step S1406, the CPU 301 notifies the control apparatus 40 of preparation completion. A preparation completion notification may also be transmitted to the downstream stacking apparatuses 60*a* and 60*b*.

In step S1407, the CPU 301 determines whether a sheet P has arrived based on a detection signal outputted from the sheet sensor 56. A sheet P having arrived means that the sheet sensor 56 detects a front end of the sheet P. When a sheet P reaches the sheet sensor 56, the CPU 301 advances the processing to step S1408.

In step S1408, the CPU 301 (read control unit 307 and inspection unit 302) executes image inspection designated according to the job information. The read control unit 307 controls the image sensors 54 and 55 to read a sheet P and generates the inspection image data 312. Furthermore, the inspection unit 302 inspects the inspection image data 312 according to the inspection settings designated by the job information. For example, the inspection unit 302 compares the inspection image data 312 and the reference image data to determine whether an image formed on the sheet P satisfies passing criteria. In particular, the inspection unit 302 executes character recognition, barcode decoding processing, and the like on a variable area and determines whether restored information coincides with correct information included in the variable component 252.

In step S1409, the CPU 301 (inspection unit 302) transmits an inspection result to the control apparatus 40 and the stacking apparatuses 60*a* and 60*b*. When the job information designates the stacking apparatus 60*a* as a discharge destination, the inspection result is transmitted at least to the stacking apparatus 60*a*. This is because the discharge destination is switched based on the inspection result.

In step S1410, the CPU 201 determines whether there are no pages to be inspected as designated according to the job information. If there still are pages to be inspected, the CPU 301 advances the processing to step S1407 and waits for the next sheet P to arrive. If there are no pages to be inspected, the CPU 301 ends the job.

Figure 15:
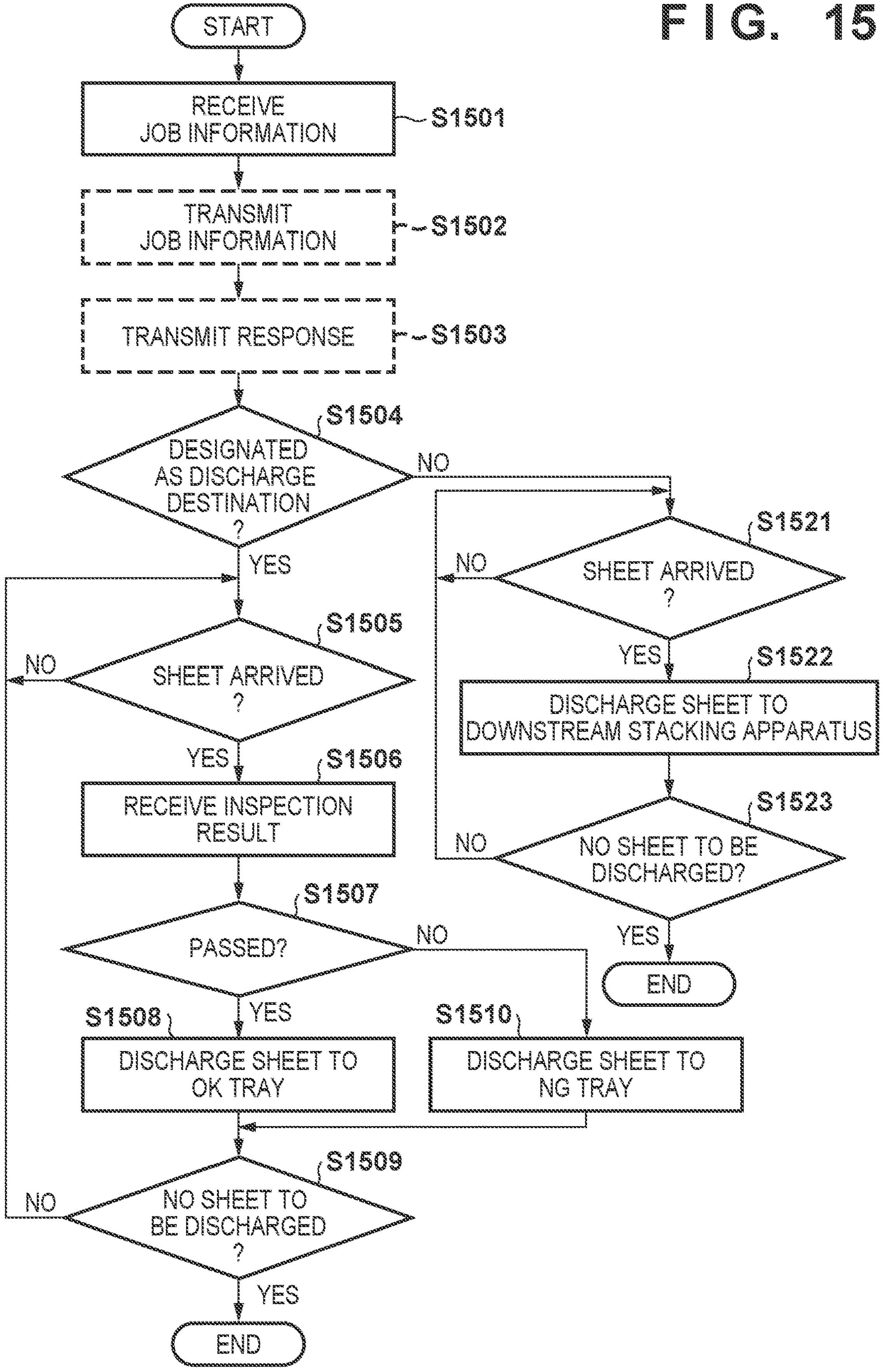
FIG. 15 is a flowchart for explaining a method of sorting sheets.

FIG. 15 is a flowchart for explaining conveyance and discharge processing to be executed by the CPU 401 of the stacking apparatus 60.

In step S1501, the CPU 401 (job control unit 402) receives job information from the inspection apparatus 50 or the upstream stacking apparatus 60. If there is a downstream stacking apparatus 60, the CPU 401 advances the processing to step S1502.

In step S1502, the CPU 401 (job control unit 402) transmits the job information to the downstream stacking apparatus 60. If the stacking apparatus 60 is the most downstream stacking apparatus 60, the CPU 401 advances the processing to step S1503.

In step S1503, a response indicating that the job information has been successfully received is transmitted to the inspection apparatus 50 or the upstream stacking apparatus 60. The upstream stacking apparatus 60 transfers the response to the inspection apparatus 50.

In step S1504, the CPU 401 determines whether it (stacking apparatus 60) is designated as a discharge destination based on the job information. When a sheet P passes through itself (stacking apparatus 60) and is discharged to the downstream stacking apparatus 60, the CPU 401 advances the processing to step S1521.

In step S1521, the CPU 401 determines whether a sheet P has arrived based on a detection signal of the sheet sensor 66. When a sheet P arrives, the CPU 401 advances the processing to step S1522.

In step S1522, the CPU 401 (flapper control unit 407) controls the motor M1 and the solenoids SL1 and SL2 and discharges the sheet P to the downstream stacking apparatus 60.

In step S1523, the CPU 401 determines whether there are no sheets P to be discharged based on the job information. If there are sheets P to be discharged, the CPU 401 advances the processing to step S1521. If there are no sheets P to be discharged, the CPU 401 ends the conveyance job.

Meanwhile, if the apparatus itself is designated as a discharge destination, the CPU 401 advances the processing from step S1504 to step S1505.

In step S1505, the CPU 401 determines whether a sheet P has arrived based on a detection signal of the sheet sensor 66. When a sheet P arrives, the CPU 401 advances the processing to step S1506.

In step S1506, the CPU 401 receives an inspection result from the inspection apparatus 50.

In step S1507, the CPU 401 determines whether the sheet P has passed the inspection based on the inspection result. If the sheet P has passed the inspection, the CPU 401 advances the processing to step S1508.

In step S1508, the CPU 401 (conveyance control unit 406 and flapper control unit 407) controls the motor M1 and the solenoids SL1 and SL2 and discharges the sheet P to the OK tray. If the sheet P has not passed the inspection, the CPU 401 advances the processing to step S1510. In step S1510, the CPU 401 controls the motor M1 and the solenoids SL1 and SL2 and discharges the sheet P to the NG tray. The OK tray and the NG tray are designated in advance according to job information.

In step S1509, the CPU 401 determines whether there are no sheets P to be discharged based on the job information. If there are sheets P to be discharged, the CPU 401 advances the processing to step S1505. If there are no sheets P to be discharged, the CPU 401 ends the discharge job.

Second Embodiment

In the first embodiment, text and a barcode are given as examples of the variable component 252. However, the variable component 252 may be an image. The variable component 252 includes coordinate information of a variable area and information content (text, barcode, and image) to be printed on the variable area. In the second embodiment, matters common to the first embodiment are given the same reference numerals, and the description thereof incorporates the description of the first embodiment. In the following, portions specific to the second embodiment will be mainly described.

Figure 16:
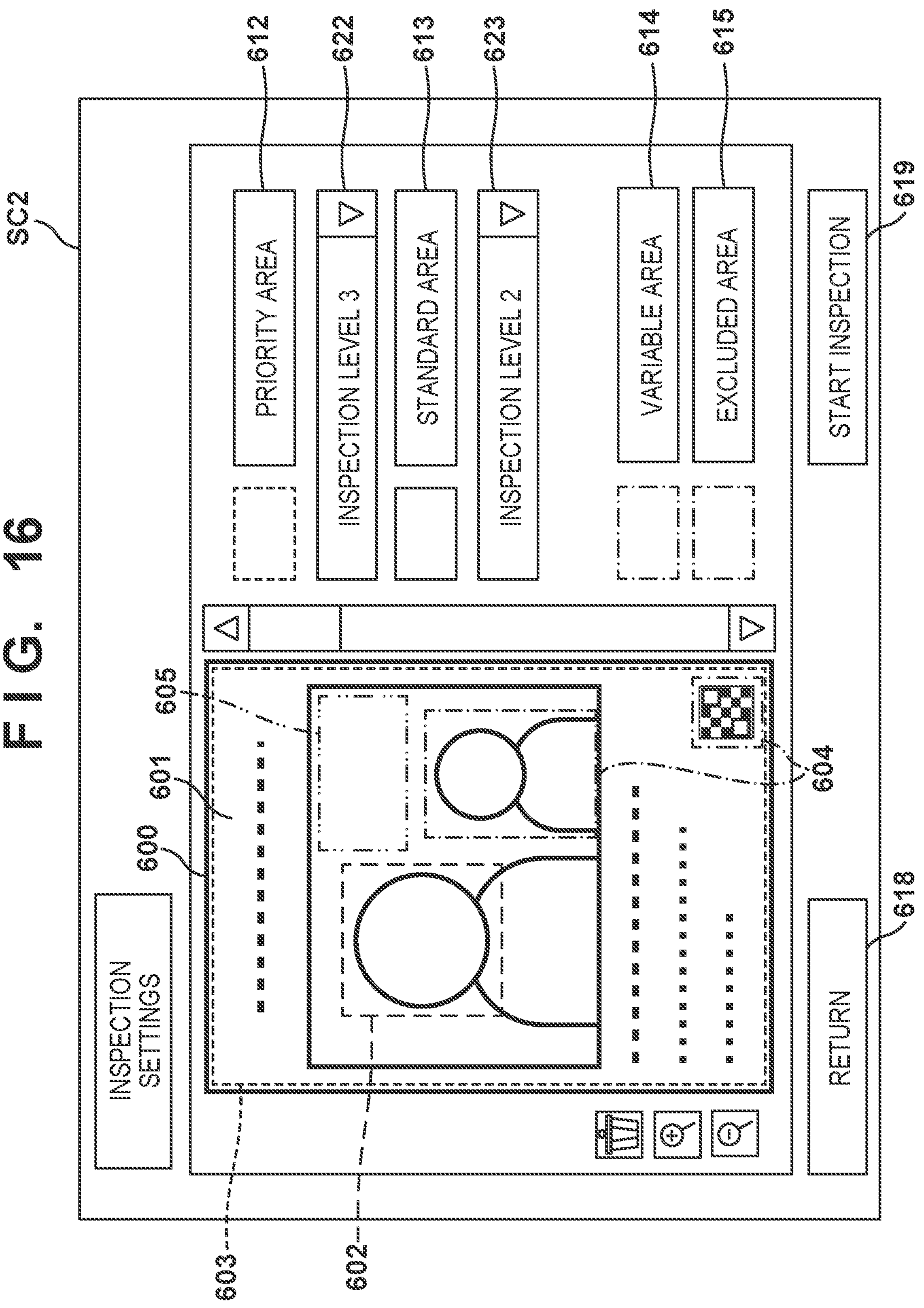
FIG. 16 is a diagram for explaining the inspection setting screen.

FIG. 16 illustrates the inspection setting screen SC2 in the second embodiment. In this case, five inspection areas 602 to 604 are illustrated. Of these, two variable areas are set as the inspection areas 604. One variable area is an area including a person image. The other variable area is an area including a two-dimensional barcode.

Figure 17:
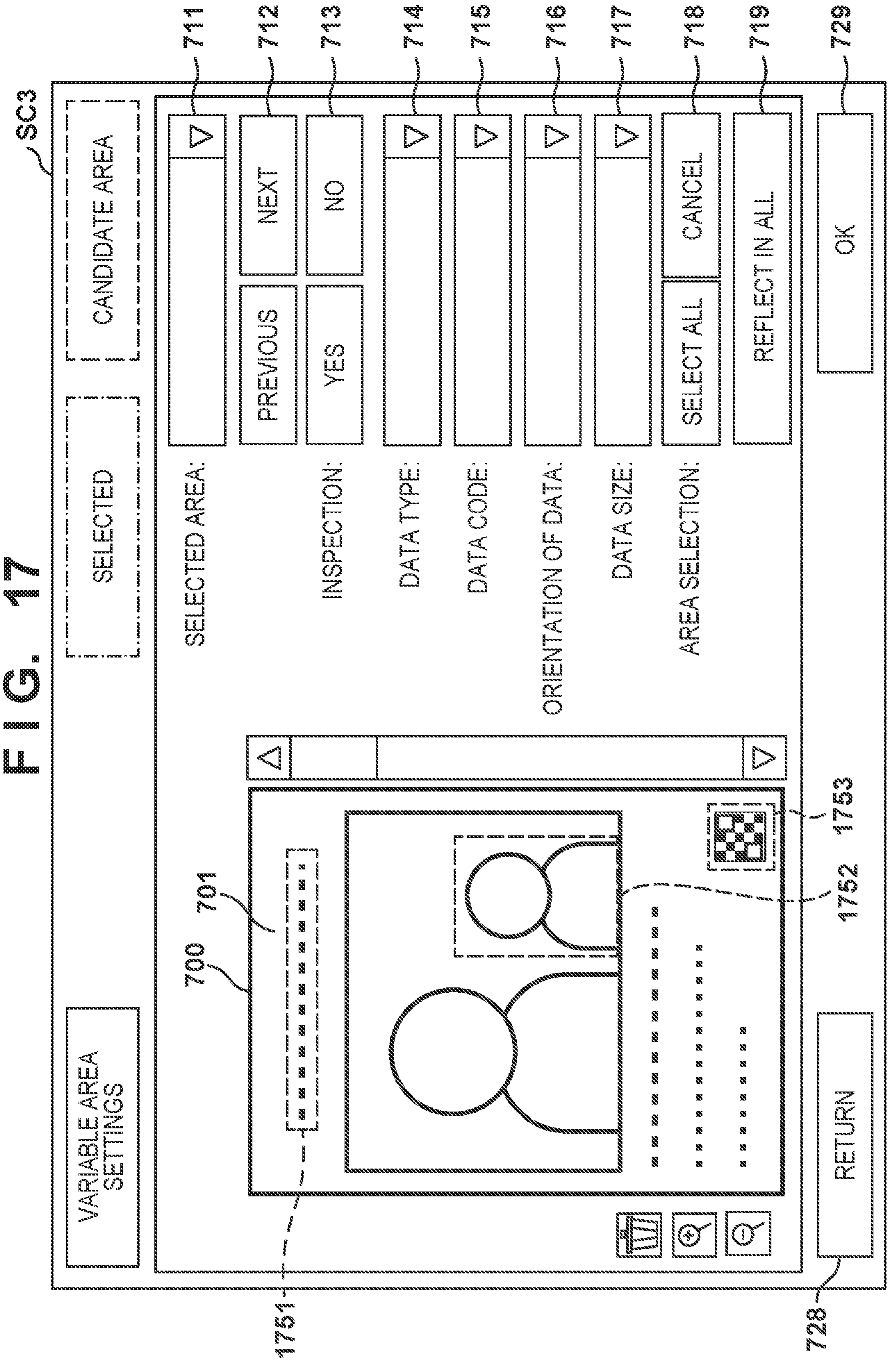
FIG. 17 is a diagram for explaining the variable area setting screen.

FIG. 17 is the variable area setting screen SC3 to be displayed when the button 614 in the inspection setting screen SC2 is pressed. In this example, three candidate areas 1751, 1752, and 1753, each being a variable area, are extracted and each is displayed in an emphasized manner using a frame. The user can select an inspection area from the three candidate areas 1751, 1752, and 1753. The three candidate areas 1751, 1752, and 1753 may be provided with identification information, such as area I, area II, and area III. That is, the button 711 can display area I, area II, area III or all areas. The user can also switch the selected candidate area displayed by the button 711 by operating the button 712.

Figure 18:
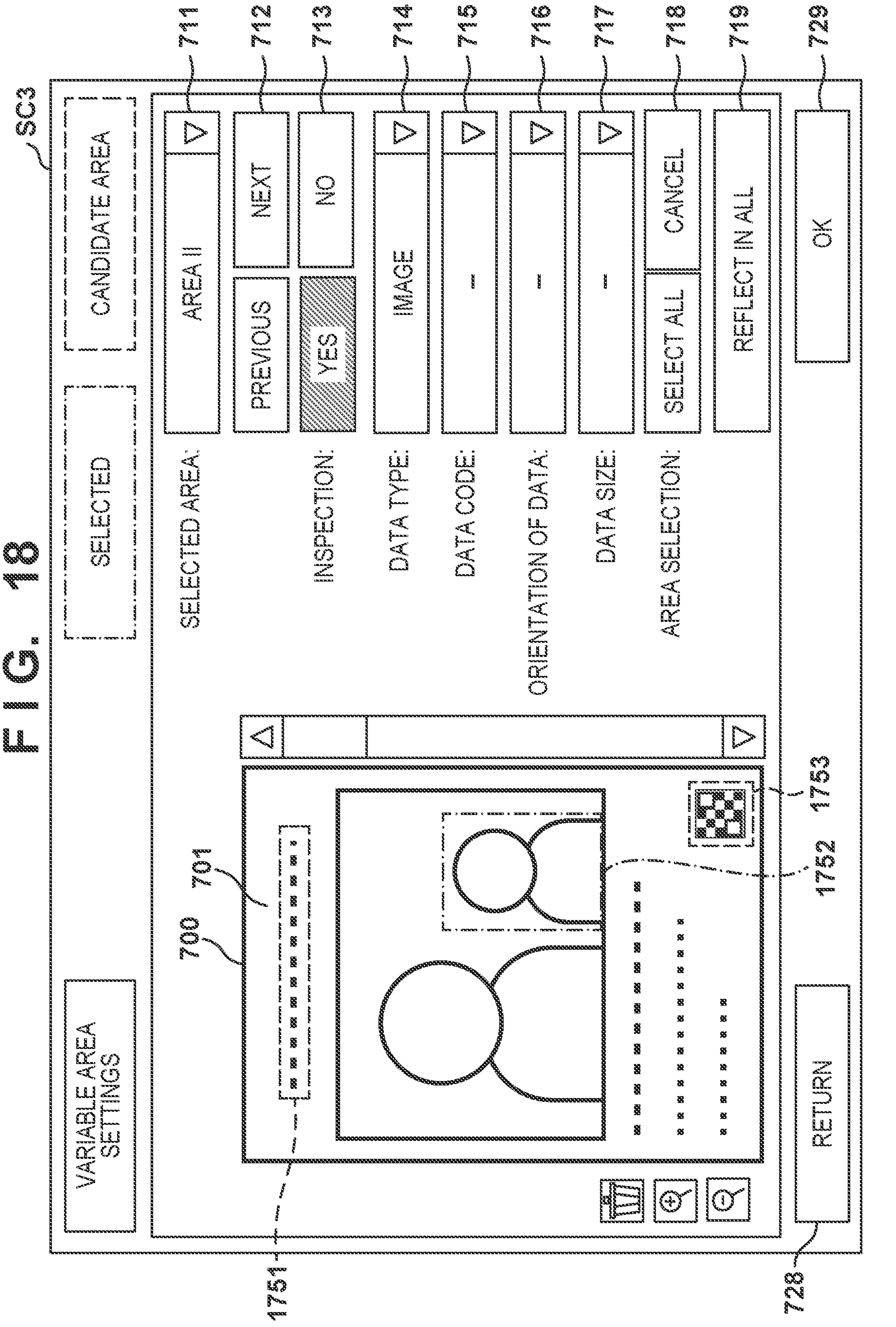
FIG. 18 is a diagram for explaining the variable area setting screen.

FIG. 18 illustrates that area II corresponding to the candidate area 1752 is selected from among the three selectable candidate areas 1751, 1752, and 1753 as an example. As described above, by operating the buttons 711, 712, and 713, area II is selected. For example, the user selects area II corresponding to the candidate area 1752 by operating the button 712 and determines area II as an inspection area by operating the button 713.

The button 714 is a button for selecting a data type, and in this example, "image" is selected as the data type. The setting unit 202 can detect that the variable component 252 of the candidate area 1752 is an image by analyzing the variable data 211. Therefore, the setting unit 202 may display "image" as a default data type on the button 714 based on the analysis result.

The data type of the candidate area 1752 is "image". Therefore, the button 715 for setting data code, the button 716 for setting an orientation of the data, and the button 717 for setting a data size are displayed to be inoperable.

The data type of area II (candidate area 1752) is "image". Therefore, in image inspection, an inspection image cut out from coordinates corresponding to the candidate area 1752 in a read image obtained from a sheet P is compared with a person image linked to the variable component 252. That is, the evaluation unit 304 calculates a degree of coincidence between the inspection image and the person image and determines pass/fail based on the degree of coincidence.

According to the second embodiment, information content printed in a variable area is either text, a barcode, or an image. The setting unit 202 analyzes the variable data 211 to extract a variable area and proposes the extracted variable area to the user as a candidate area. Therefore, the user can select a variable area as an inspection area more accurately. As a result, the user's errors in setting a variable area will be reduced. That is, it is possible to improve the usability for when performing settings for inspection of an image on a sheet.

Third Embodiment

The third embodiment relates to a method for notifying an image inspection result. When the inspection apparatus 50 receives an image inspection result, the CPU 201 (notification unit 207) of the control apparatus 40 notifies an image inspection result on the display apparatus 21.

Figure 19:
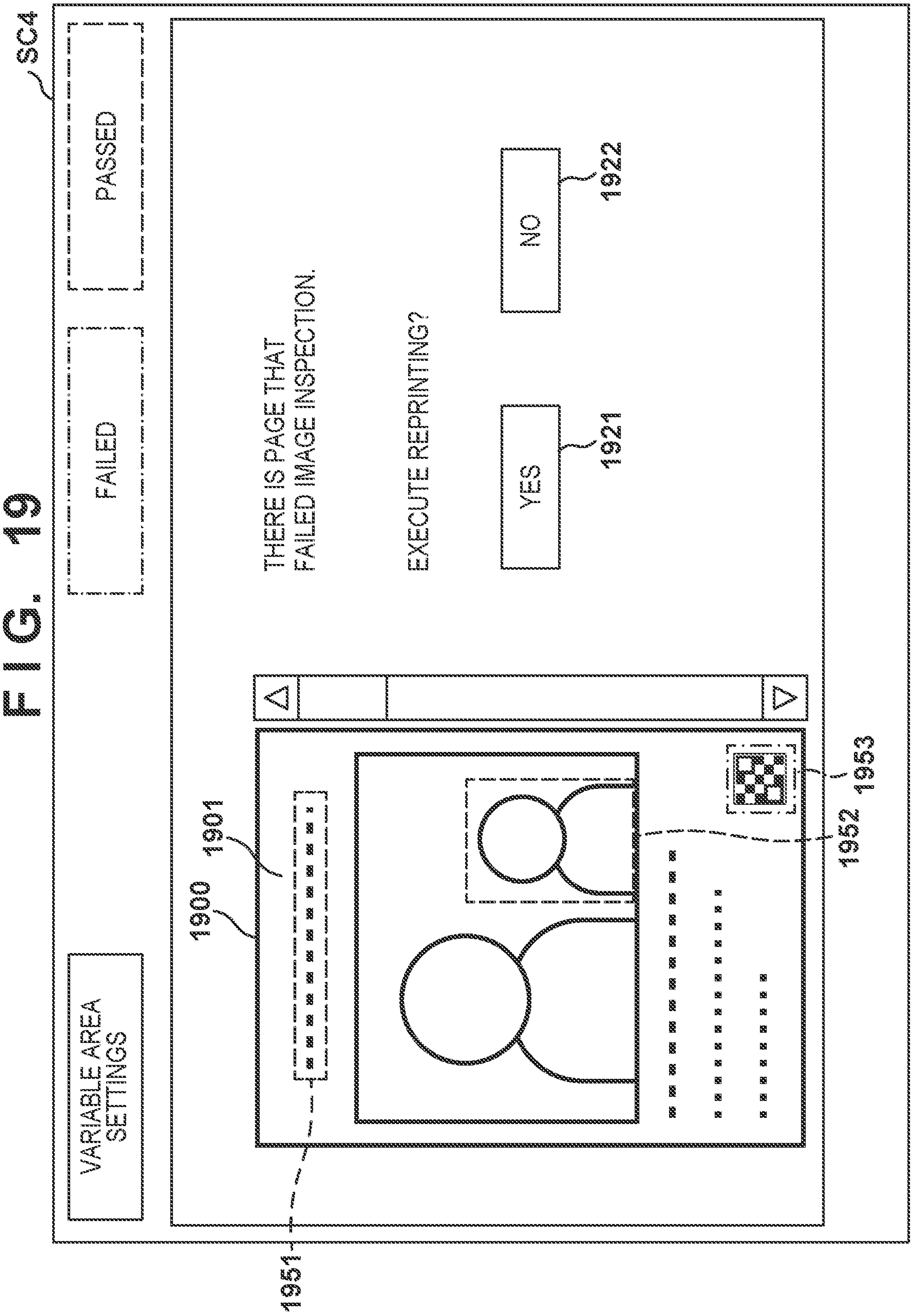
FIG. 19 is a diagram for explaining a notification screen.

FIG. 19 is a diagram illustrating a notification screen SC4. An image display area 1900 is a display area for displaying a read image 1901 of a sheet that has been determined as failed by the inspection apparatus 50 among a plurality of sheets P. An image inspection result may include information indicating pass/fail for each inspection area in addition to pass/fail for each sheet P. The CPU 201 displays frames indicating inspection areas 1951 to 1953 in a superimposed manner on the read image based on coordinate information of the inspection areas 1951 to 1953 included in the image inspection result. In this example, the inspection areas 1951 and 1952 are surrounded by dashed frames. A dashed frame indicates that it passed the inspection. The inspection area 1953 is surrounded by a one-dot dashed frame. The one-dot dashed frame indicates that it failed the inspection. In the sheet P, a plurality of inspection areas 1951 to 1953 are set, and if even one of the inspection areas fails, the entire sheet P is determined to be a fail. In other words, a one-dot dashed frame indicates an inspection area that caused the sheet P to be determined as failed. This makes it possible for the user to easily ascertain the cause of the failure. That is, it is possible to improve the usability for when performing settings for inspection of an image on a sheet.

The notification screen SC4 may display a message prompting re-printing of a failed sheet P. Further, the notification screen SC4 may include a button 1921 for instructing reprinting and a button 1922 for instructing not to execute reprinting.

Technical Concepts Derived From Embodiments (Item 1)

According to the first to third embodiments, in variable printing in which a master image and a variable image are printed, data to be a basis for the variable image is analyzed, and at least one candidate area selectable by the user is extracted as an inspection area. The user selects an inspection area from one or more candidate areas displayed on a setting screen. Therefore, errors in inspection settings for variable printing are reduced. The image inspection apparatus may be implemented in an information processing apparatus, such as the host computer 70.

(Item 2)

The extraction unit 1102 includes the OCR unit 1132 for executing character recognition for a variable image and may extract an area in which character recognition by the OCR unit 1132 has been successful as a candidate area. In variable printing, text (letters, numbers) may be changed for each page. Therefore, it is highly likely that an area in which text is printed is a variable area necessitating inspection. In particular, the variable data 211 may be simply a bitmap image, which is not described in PPML. In such a case, the extraction unit 1102 may extract a candidate area by utilizing the OCR unit 1132.

(Item 3)

The extraction unit 1102 includes the decoding unit 1133 for executing barcode recognition for a variable image and may extract an area in which barcode recognition by the decoding unit 1133 has been successful as a candidate area. In variable printing, a different barcode may be printed for each page. Therefore, it is highly likely that an area in which a barcode is printed is a variable area. In particular, the variable data 211 may be simply a bitmap image, which is not described in PPML. In such a case, the extraction unit 1102 may extract a candidate area by utilizing the decoding unit 1133.

(Item 4)

The display apparatus 21 may display a pull-down menu (button 711) including a list of a plurality of candidate areas in the setting screen. The setting accepting unit 1114 may accept selection of an inspection area through the pull-down menu. This makes it possible for the user to easily select an inspection area from the plurality of candidate areas.

(Item 5)

The display apparatus 21 may display the candidate area selected as the inspection area through the pull-down menu in a display area in an emphasized manner. For example, the selected candidate area (inspection area) may be emphasized using a type of line indicating a frame or a color of the line. This may make it possible for the user to visually distinguish between other candidate areas and the selected candidate area.

(Item 6)

The variable area setting screen SC3 may include an information display unit (e.g., button 711) for displaying identification information (e.g., area I, II) of a candidate area to be selected as an inspection area among the plurality of candidate areas. The setting accepting unit 1114 may detect a switch instruction (e.g., button 712) for switching one candidate area whose identification information is displayed on the button 711 among the plurality of candidate areas. This makes it possible for the user to easily switch the selected candidate area.

(Item 7)

The display apparatus 21 displays identification information indicating one candidate area on the button 711 and may display a frame surrounding the one candidate area on the display area. Thus, the name of the candidate area and the frame indicating the candidate area are switched in conjunction. By confirming the change of the name and the change of the frame, the user can easily ascertain what name is assigned to which frame.

(Item 8)

The variable area setting screen SC3 may display a plurality of candidate areas. The setting accepting unit 1114 may detect a collective selection instruction (button 718) for collectively selecting the plurality of candidate areas displayed on the variable area setting screen SC3 as inspection areas. This may make it possible for the user to easily set all candidate areas as inspection areas.

(Item 9)

The setting accepting unit 1114 may detect a reflection instruction (button 719) for reflecting common inspection settings for the plurality of candidate areas selected as inspection areas by the collective selection instruction. This may make it possible for the user to easily set inspection parameters for the plurality of inspection areas.

(Item 10)

The communication circuit 220 includes a receiving circuit for receiving arrangement information (e.g., variable data 211 described in PPML) indicating a position at which a variable image is arranged from an information processing apparatus capable of communicating with the image inspection apparatus. The extraction unit 1102 may extract the candidate area based on the arrangement information of the variable image. In this case, it may be possible to easily identify coordinates of the variable area without executing OCR or decoding.

(Item 11)

The classification unit 1121 may classify an information attribute of the variable image into either text, barcode, or image based on an analysis result for the variable image. As described in association with FIGS. 8 to 10, the adjusting unit 1122 may adjust the number or content of inspection parameters that can be set by the user for the inspection area according to the classification result. This may make it possible for the user to set appropriate inspection parameters according to the information attribute. In other words, errors in inspection settings will be further reduced.

(Item 12)

The extraction unit 1102 may extract at least one candidate area by analyzing variable data described in Personalized Print Markup Language (PPML).

(Item 13)

The variable data may include the master component 251 defining the master image and its print coordinates and the variable component 252 defining the variable image and its print coordinates. The extraction unit 1102 may extract at least one candidate area by analyzing the variable component 252.

(Item 14)

The notification unit 207 and the display apparatus 21 notify an image inspection result. This makes it possible for the user to easily ascertain the inspection result.

(Item 15)

The notification unit 207 may display a read image obtained from a sheet P determined as failed among a plurality of sheets and an inspection area that is the cause of the failure in a superimposed manner. This makes it possible for the user to immediately ascertain the cause of the failure. The user may also execute adjustment of the image forming system 100 to resolve the failure or adjustment of inspection parameters. This may reduce the consumption of sheets P.

(Item 16)

The image forming apparatus 30 is an example of an image forming unit for forming an image on a sheet P. The image sensors 54 and 55 are examples of an image reader for reading the image formed on the sheet P. An image inspection processor (e.g., CPU 301, inspection unit 302) executes image inspection in the inspection area based on the reading result of the image formed on the sheet by the image reader. The image inspection includes processing for comparing a correct image (reference image) and the read image and processing for comparing correct text and text obtained (restored) from the read image.

(Item 17)

The CPU 200 and the setting unit 202 set image inspection content in the image inspection. The image forming system 100 may be referred to as an image forming apparatus or may be referred to as an image inspection apparatus.

(Item 18)

The sheet tray 61*a* is an example of a first stacking tray on which a sheet P that has passed the image inspection is stacked. The sheet tray 62*a* is an example of a second stacking tray on which a sheet P that has not passed the image inspection is stacked. The flappers F1*a* and F2*a* sort a sheet P to the first stacking tray or the first stacking tray based on the image inspection result.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-048614, filed Mar. 24, 2023 which is hereby incorporated by reference herein in its entirety.

What is claimed is:

1. An inspection system comprising:

a display configured to display a setting screen for setting content of an image inspection;

an input device configured to set an area, in which an image to be formed is changed for each sheet, as a variable area in the setting screen; and a processor configured to execute the image inspection according to a condition set in the setting screen, wherein the processor presents a candidate area, in which the image inspection is to be performed, as the variable area in the setting screen before the variable area is set by the input device.

2. The inspection system according to claim 1, further comprising:

a reading unit configured to read an image formed on a sheet.

3. The inspection system according to claim 1, wherein the processor is further configured to present a candidate area according to a reference image.

4. The inspection system according to claim 2, wherein the processor is further configured to present a candidate area according to a read image obtained by the reading unit.

5. The inspection system according to claim 1, wherein the processor is further configured to present a candidate area according to print data.

6. The inspection system according to claim 1, wherein the processor is further configured to execute character recognition on the image printed in the variable area and extract a variable area for which the character recognition has been successful as the candidate area.

7. The inspection system according to claim 1, wherein the processor is further configured to execute barcode recognition on the image printed in the variable area and extract a variable area for which the barcode recognition has been successful as the candidate area.

8. The inspection system according to claim 1, wherein the display is configured to display, in the setting screen, a pull-down menu including a list of a plurality of candidate areas extracted by the processor, and the input device is configured to accept selection of the candidate area through the pull-down menu.

9. The inspection system according to claim 8, wherein the display displays the candidate area selected through the pull-down menu in an emphasized manner.

10. The inspection system according to claim 1, wherein the setting screen includes an information display area for displaying identification information of one candidate area selected from among a plurality of candidate areas extracted by the processor, and the input device detects an instruction for switching the one candidate area whose identification information is displayed in the information display area among the plurality of candidate areas.

11. The inspection system according to claim 10, wherein the display displays identification information indicating the one candidate area and a frame surrounding that one candidate area.

12. The inspection system according to claim 1, wherein the setting screen displays a plurality of candidate areas extracted by the processor, and the input device detects a collective selection instruction for collectively selecting the plurality of candidate areas displayed in the setting screen.

13. The inspection system according to claim 12, wherein the input device detects a reflection instruction for reflecting an inspection setting common to the plurality of candidate areas selected by the collective selection instruction.

14. The inspection system according to claim 1, further comprising:

a reception circuit configured to receive arrangement information indicating a position at which the image is arranged from an information processing apparatus capable of communicating with the inspection system, wherein the processor extracts at least one candidate area based on the arrangement information of the image.

15. The inspection system according to claim 1, wherein the processor is further configured to:

classify an information attribute of the image into either text, barcode, or image based on an analysis result of the image; and adjust the number or content of inspection parameters that a user can set for the candidate area according to a classification result of the classification.

16. The inspection system according to claim 1, wherein the processor is configured to extract at least one candidate area by analyzing variable data described in Personalized Print Markup Language (PPML).

17. The inspection system according to claim 16, wherein the variable data includes a master component defining a first image which is in common for a plurality of sheets and its print coordinates and a variable component defining a second image to be printed in the variable area and its print coordinates, and the processor is configured to extract the at least one candidate area by analyzing the variable component.

18. The inspection system according to claim 1, wherein the display is further configured to notify an inspection result of the image inspection.

19. The inspection system according to claim 14, wherein the display is configured to display a read image obtained from a sheet determined as failed by the processor among a plurality of sheets and an inspection area that caused the failure in a superimposed manner.

20. An image forming apparatus comprising:

an image forming unit configured to form an image on a sheet;

an image reader configured to read the image formed on the sheet; and an inspection system including:

a display configured to display a setting screen for setting content of an image inspection;

an input device configured to set an area, in which an image to be formed is changed for each sheet, as a variable area in the setting screen; and a processor configured to execute the image inspection according to a condition set in the setting screen, wherein the processor presents a candidate area, in which the image inspection is to be performed, as the variable area in the setting screen before the variable area is set by the input device.

21. The image forming apparatus according to claim 20, further comprising:

a first stacking tray on which a sheet that has passed the image inspection is stacked;

a second stacking tray on which a sheet that has not passed the image inspection is stacked; and a flapper configured to sort the sheet to the first stacking tray or the second stacking tray based on a result of the image inspection.

* * * * *